(12) United States Patent
Kniffler et al.

(10) Patent No.: US 10,830,500 B2
(45) Date of Patent: Nov. 10, 2020

(54) HEAT PUMP SYSTEM HAVING CO2 AS THE FIRST HEAT PUMP MEDIUM AND WATER AS THE SECOND HEAT PUMP MEDIUM

(71) Applicant: Efficient Energy GmbH, Feldkirchen (DE)

(72) Inventors: Oliver Kniffler, Sauerlach (DE); Jürgen Süss, Bodolz (DE)

(73) Assignee: EFFICIENT ENERGY GMBH, Feldkirchen (DE)

( * ) Notice: Subject to any disclaimer, the term of this patent is extended or adjusted under 35 U.S.C. 154(b) by 93 days.

(21) Appl. No.: 16/254,852

(22) Filed: Jan. 23, 2019

(65) Prior Publication Data
US 2019/0154310 A1 May 23, 2019

Related U.S. Application Data

(63) Continuation of application No. PCT/EP2017/068662, filed on Jul. 24, 2017.

(30) Foreign Application Priority Data

Jul. 26, 2016 (DE) .......................... 10 2016 213 680

(51) Int. Cl.
*F25B 7/00* (2006.01)
*F25B 9/10* (2006.01)
(Continued)

(52) U.S. Cl.
CPC ................ *F25B 9/10* (2013.01); *F25B 1/053* (2013.01); *F25B 7/00* (2013.01); *F25B 9/008* (2013.01);
(Continued)

(58) Field of Classification Search
CPC .... F25B 1/053; F25B 2400/22; F25B 25/005; F25B 2600/0253; F25B 2700/2103;
(Continued)

(56) References Cited

U.S. PATENT DOCUMENTS 4,648,794 A * 3/1987 Hunjan ................. F04D 29/106
415/143
5,520,008 A 5/1996 Ophir et al.
(Continued)

FOREIGN PATENT DOCUMENTS

CN 1129750 C 8/1996
CN 1886625 B2 12/2006
(Continued)

OTHER PUBLICATIONS

International Search Report and Written Opinion for PCT/EP2017/068662 dated Oct. 6, 2017.
(Continued)

*Primary Examiner* — Filip Zec
(74) *Attorney, Agent, or Firm* — McClure, Qualey & Rodack, LLP

(57) ABSTRACT

A heat pump system includes a first heat pump arrangement configured to operate with a first heat pump medium including CO2; a second heat pump arrangement configured to operate with a second heat pump medium including water; and a coupler for thermally coupling the first heat pump arrangement to the second heat pump arrangement.

15 Claims, 19 Drawing Sheets

(51) Int. Cl.
*F25B 9/00* (2006.01)
*F25B 49/02* (2006.01)
*F25B 1/053* (2006.01)
*F25B 25/00* (2006.01)

(52) U.S. Cl.
CPC .......... *F25B 49/022* (2013.01); *F25B 25/005* (2013.01); *F25B 2400/22* (2013.01); *F25B 2600/0253* (2013.01); *F25B 2700/2103* (2013.01); *F25B 2700/21161* (2013.01); *F25B 2700/21171* (2013.01); *Y02B 30/741* (2013.01)

(58) Field of Classification Search
CPC .. F25B 2700/21161; F25B 2700/21171; F25B 49/022; F25B 7/00; F25B 9/008; F25B 9/10; Y02B 30/741
See application file for complete search history.

(56) References Cited

U.S. PATENT DOCUMENTS

| | | | |
|---|---|---|---|
| 6,298,683 | B1 | 10/2001 | Kondo et al. |
| 6,688,117 | B1* | 2/2004 | Ophir .................... F04D 29/701 62/74 |
| 7,526,924 | B2 | 5/2009 | Wakamoto et al. |
| 9,097,444 | B2* | 8/2015 | Lee ........................... F25B 7/00 |
| 9,157,667 | B2 | 10/2015 | Kasuya et al. |
| 9,207,003 | B2* | 12/2015 | Said ....................... F25B 27/007 |
| 9,234,663 | B2* | 1/2016 | Woo .................... F24D 19/1054 |
| 10,041,708 | B2 | 8/2018 | Sedlak et al. |
| 2004/0050093 | A1 | 3/2004 | Lifson et al. |
| 2007/0245759 | A1 | 10/2007 | Sedlak et al. |
| 2013/0227979 | A1 | 9/2013 | Kasuka et al. |
| 2013/0269373 | A1 | 10/2013 | Radhakrishnan et al. |
| 2014/0318171 | A1 | 10/2014 | Pellegrini |
| 2014/0338377 | A1 | 11/2014 | Pellegrini |
| 2015/0068228 | A1 | 3/2015 | Sedlak et al. |
| 2015/0233618 | A1 | 8/2015 | Sedlak et al. |
| 2015/0345835 | A1 | 12/2015 | Martin et al. |
| 2016/0109139 | A1 | 4/2016 | Sedlak et al. |
| 2017/0051949 | A1* | 2/2017 | Uselton .................... F25B 9/10 |

FOREIGN PATENT DOCUMENTS

| | | |
|---|---|---|
| CN | 103210264 A | 7/2013 |
| CN | 203615641 U | 5/2014 |
| CN | 104428610 A | 3/2015 |
| CN | 105698432 A | 6/2016 |
| DE | 44 31 887 A1 | 3/1995 |
| DE | 29 516 951 U1 | 1/1996 |
| DE | 196 42 702 A1 | 4/1997 |
| DE | 10 2012 208 174 A1 | 11/2013 |
| EP | 2 016 349 B1 | 5/2011 |
| EP | 2 511 627 A1 | 10/2012 |
| EP | 2 631 562 A1 | 8/2013 |
| EP | 2631562 A1 | 8/2013 |
| EP | 2 995 885 A1 | 3/2016 |
| EP | 2995885 A1 | 3/2016 |
| EP | 2995885 B1 | 3/2016 |
| WO | 2007/118482 A1 | 10/2007 |
| WO | 2014/072239 A1 | 5/2014 |

OTHER PUBLICATIONS

Chinese Office Action dated Jun. 15, 2020, issued in application No. 2017800590602.
Chinese Office Action dated Jun. 19, 2020, issued in application No. 2017800590918.

* cited by examiner

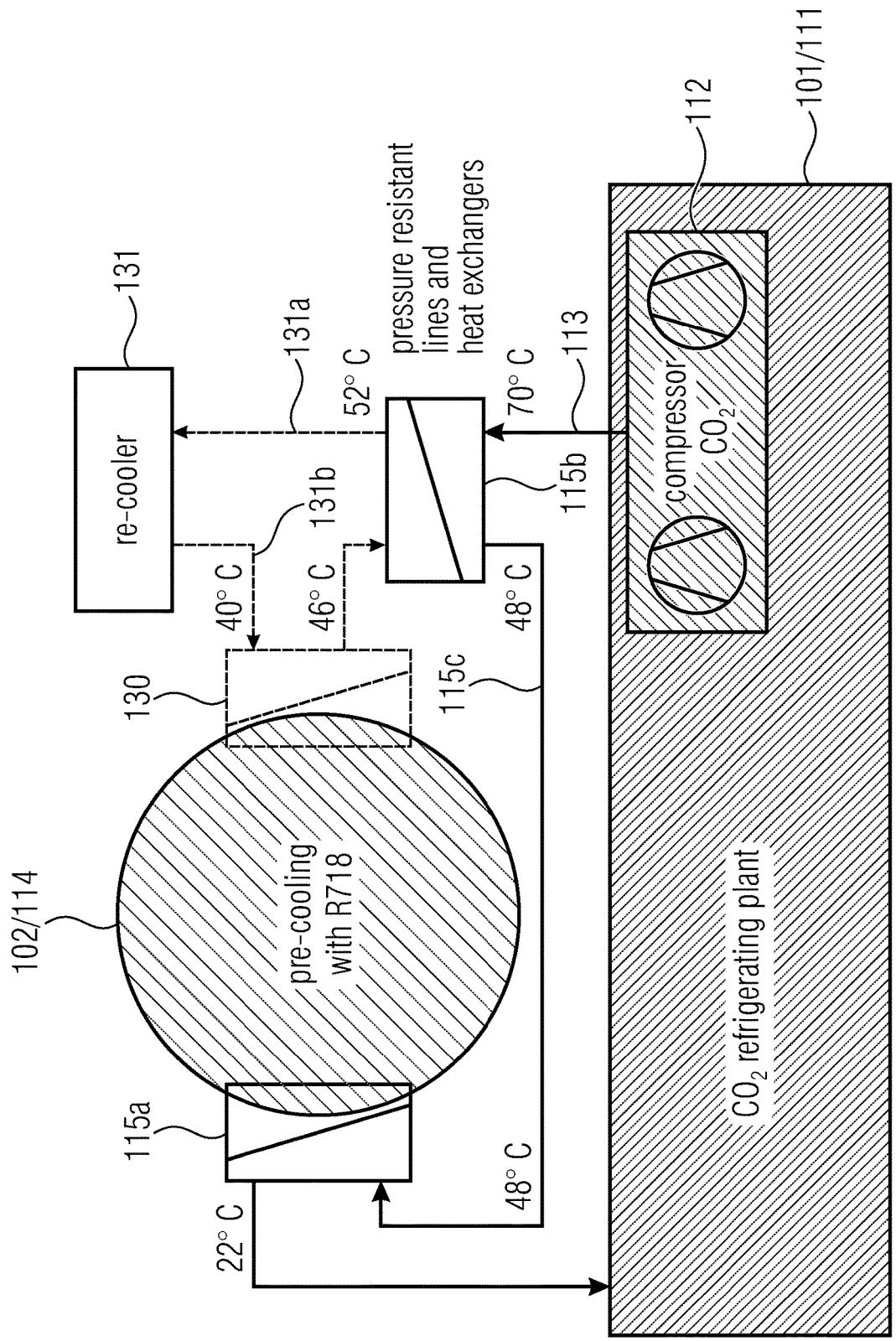

| | mode | connections | | |
|---|---|---|---|---|
| 451 | HPM | 401-411 | 402-413 | 403-412 |
| 452 | MPM | 401-411 | 402-412 | 403-413 |
| 453 | FCM | 401-412 | 402-411 | 403-413 |
| 454 | LPM | 401-413 | 402-411 | 403-412 |

| mode | compr. 1 | compr. 2 | PZ | PV | PK |
|---|---|---|---|---|---|
| HPM | on | on | on | on | on |
| MPM | on | off | on | on | on |
| FCM | on | off | on | on | on |
| LPM | off | off | off | on | on |

Fig. 7A

| mode | upper 2x2 | lower 2x2 |
|---|---|---|
| HPM | / | \ |
| MPM | / | / |
| FCM | \ | / |
| LPM | \ | \ |

Fig. 7B

| temperature of the area to be heated | exemplary temperature | mode of operation ("coarse control") |
|---|---|---|
| very cold | t ≤ 16°C | 1st mode of operation (LPM) HP is bridged (control for area to be heated) |
| medium cold | 16°C ≤ t ≤ 22°C | free-cooling mode (FCM) 1st stage operates at low power |
| warm | 22°C ≤ t ≤ 28°C | normal mode (MPM) of the 1st stage |
| very warm | 28°C ≤ t ≤ 40°C | second stage is activated (HPM) |

"fine control" by speed adjustment of the centrifugal compressor (bracketing FCM, MPM, HPM rows)

Fig. 7C

| $T_{liquef.}$ | reaction | $T_{compr.}$ | reaction |
|---|---|---|---|
| very cold | 1st mode of operation (LPM) | < $T_{target}$ | reduction of heat dissipation |
| medium cold | free-cooling mode (FCM) | > $T_{target}$ | increase in speed of centrifugal compressor |
| warm | 1st stage (MPM) | > $T_{target}$ | increase in speed of 1st stage |
| very warm | 1st stage + 2nd stage (HPM) | > $T_{target}$ << | control of 1st stage and 2nd stage |

Fig. 7D

| P [hPa] | 8 | 12 | 30 | 60 | 100 | 1000 |
|---|---|---|---|---|---|---|
| compr. temp. | 4°C | 12°C | 24°C | 36°C | 45°C | 100°C |

HEAT PUMP SYSTEM HAVING CO2 AS THE FIRST HEAT PUMP MEDIUM AND WATER AS THE SECOND HEAT PUMP MEDIUM

CROSS-REFERENCES TO RELATED APPLICATIONS

This application is a continuation of copending International Application No. PCT/EP2017/068662, filed Jul. 24, 2017, which is incorporated herein by reference in its entirety, and additionally claims priority from German Application No. DE 102016213680.1, filed Jul. 26, 2016, which is incorporated herein by reference in its entirety.

The present invention relates to heat pumps for cooling or for any other application of a heat pump.

BACKGROUND OF THE INVENTION

FIG. 8A and FIG. 8B provide a heat pump as is described in European Patent EP 2016349 B1. FIG. 8A shows a heat pump which initially comprises a water evaporator 10 for evaporating water as a refrigerant, or refrigerating medium, so as to generate vapor within a working vapor line 12 on the output, or exit, side. The evaporator includes an evaporation space (evaporation chamber) (not shown in FIG. 8A) and is configured to generate an evaporation pressure smaller than 20 hPa within said evaporation space, so that at temperatures below 15° C. within the evaporation space, the water will evaporate. The water is advantageously ground water, brine, i.e. water having a certain salt content, which freely circulates in the earth or within collector pipes, river water, lake water or sea water. Thus, any types of water, i.e. limy water, lime-free water, salty water or salt-free water, may be used. This is due to the fact that any types of water, i.e. all of said "water materials" have the favorable water property that water, which is also known as "R 718", has an enthalpy difference ratio of 6 that can be used for the heat pump process, which corresponds to more than double the typical enthalpy difference ratio of, e.g., R 134a.

Through the suction line 12, the water vapor is fed to a compressor/condenser system 14 comprising a fluid flow machine (turbo-machine) such as a centrifugal compressor, for example in the form of a turbocompressor, which is designated by 16 in FIG. 8A. The fluid flow machine is configured to compress the working vapor to a vapor pressure at least larger than 25 hPa, 25 hPa corresponds to a condensation temperature of about 22° C., which may already be a sufficient heating flow temperature of an underfloor heating system. In order to generate higher flow temperatures, pressures larger than 30 hPa may be generated by means of the fluid flow machine 16, a pressure of 30 hPa having a condensation temperature of 24° C., a pressure of 60 hPa having a condensation temperature of 36° C., and a pressure of 100 hPa having a condensation temperature of 45° C. Underfloor heating systems are designed to be able to provide sufficient heating with a flow temperature of 45° C. even on very cold days.

The fluid flow machine is coupled to a condenser (liquefier) 18 configured to condense the compressed working vapor. By means of the condensing process, the energy contained within the working vapor is fed to the condenser 18 so as to then be fed to a heating system via the advance 20a. Via the backflow 20b, the working liquid flows back into the condenser.

It is possible to directly withdraw the heat (energy), which is absorbed by the heating circuit water, from the high-energy water vapor by means of the colder heating circuit water, so that said heating circuit water heats up. In the process, a sufficient amount of energy is withdrawn from the vapor so that said stream is condensed and also is part of the heating circuit.

Thus, introduction of material into the condenser and/or the heating system takes place which is regulated by a drain 22 such that the condenser in its condenser space has a water level which remains below a maximum level despite the continuous supply of water vapor and, thus, of condensate.

As was already explained, an open circuit may be used. I.e. water, which represents the heat source, may be evaporated directly without using a heat exchanger. However, alternatively, the water to be evaporated might also be initially heated up by an external heat source via a heat exchanger. However, it is to be taken into account here that this heat exchanger will again constitute losses and expenditure in terms of apparatus.

In addition, in order to also avoid losses for the second heat exchanger, which has been present on the condenser side, the medium can be used directly there as well. When one thinks of a house comprising an underfloor heating system, the water coming from the evaporator may circulate directly within the underfloor heating system.

Alternatively, however, a heat exchanger supplied by the advance 20a and exhibiting the backflow 20b may also be arranged on the condenser side, said heat exchanger cooling the water present within the condenser and thus heating up a separate underfloor heating liquid, which typically will be water.

Due to the fact that water is used as the working medium and due to the fact that only that portion of the ground water that has been evaporated is fed into the fluid flow machine, the degree of purity of the water does not make any difference. Just like the condenser and the underfloor heating system, which is possibly directly coupled, the fluid flow machine is supplied with distilled water, so that the system has reduced maintenance requirements as compared to today's systems. In other words, the system is self-cleaning since the system only ever has distilled water supplied to it and since the water within the drain 22 is thus not contaminated.

In addition, it shall be noted that fluid flow machines exhibit the property that they similar to the turbine of a plane do not bring the compressed medium into contact with problematic substances such as oil, for example. Instead, the water vapor is merely compressed by the turbine and/or the turbocompressor, but is not brought into contact with oil or any other medium impairing purity, and is thus not soiled.

The distilled water discharged through the drain thus can readily be re-fed to the ground water—if this does not conflict with any other regulations. Alternatively, here it can also be made to seep away, e.g. in the garden or in an open space, or it can be fed to a sewage plant via the sewer system if this is demanded by regulations.

Due to the combination of water as the working medium with the enthalpy difference ratio, the usability of which is double that of R 134a, and due to the thus reduced requirements placed upon the closed nature of the system (rather, an open system is advantageous) and due to the utilization of the fluid flow machine, by means of which the compression factors which may be used are efficiently achieved without any impairments in terms of purity, an efficient and environmentally neutral heat pump process is provided which will become more efficient when the water vapor is directly liquefied within the liquefier (condenser), since in this case not a single heat exchanger will be required anymore in the entire heat pump process.

FIG. 8B shows a table for illustrating various pressures and the evaporation temperatures associated with said pressures, which results in that relatively low pressures are to be selected within the evaporator in particular for water as the working medium.

In order to achieve a heat pump having a high efficiency factor it is important for all components, i.e., the evaporator, the liquefier and the compressor, to be configured favorably.

EP 2016349 B1 further shows that a liquefier drain is employed for accelerating the evaporation process, so that the wall of a drain pipe acts as a nucleus for nucleate boiling. In addition, the drain itself may also be used for intensifying formation of bubbles. To this end, the liquefier drain is connected to a nozzle pipe which has a sealing at one end and which comprises nozzle openings. The warm liquefier water which is fed from the liquefier via the drain at a rate of, e.g., 4 ml per second, is now fed into the evaporator. It will evaporate on its way from a nozzle opening within the nozzle pipe or directly at the exit at a nozzle, due to the pressure which is too low for the temperature of the drain water, already underneath the surface of the evaporator water. The vapor bubbles arising there will directly act as boiling nuclei for the evaporator water that is conveyed via the intake. Thus, efficient nucleate boiling can be triggered within the evaporator without taking any major additional measures.

DE 4431887 A1 discloses a heat pump system comprising a light-weight, large-volume high-performance centrifugal compressor. Vapor which leaves a compressor of a second stage exhibits a saturation temperature which exceeds the ambient temperature or the temperature of cooling water that is available, whereby heat dissipation is enabled. The compressed vapor is transferred from the compressor of the second stage into the liquefier unit, which consists of a granular bed provided inside a cooling-water spraying means on an upper side supplied by a water circulation pump. The compressed water vapor rises within the condenser through the granular bed, where it enters into a direct counter flow contact with the cooling water flowing downward. The vapor condenses, and the latent heat of the condensation that is absorbed by the cooling water is discharged to the atmosphere via the condensate and the cooling water, which are removed from the system together. The liquefier is continually flushed, via a conduit, with non-condensable gases by means of a vacuum pump.

WO 2014072239 A1 discloses a condenser having a condensation zone for condensing vapor, that is to be condensed, within a working liquid. The condensation zone is configured as a volume zone and has a lateral boundary between the upper end of the condensation zone and the lower end. Moreover, the condenser includes a vapor introduction zone extending along the lateral end of the condensation zone and being configured to laterally supply vapor that is to be condensed into the condensation zone via the lateral boundary. Thus, actual condensation is made into volume condensation without increasing the volume of the condenser since the vapor to be condensed is introduced not only head-on from one side into a condensation volume and/or into the condensation zone, but is introduced laterally and, advantageously, from all sides. This not only ensures that the condensation volume made available is increased, given identical external dimensions, as compared to direct counterflow condensation, but that the efficiency of the liquefier is also improved at the same time since the vapor to be condensed that is present within the condensation zone has a flow direction that is transverse to the flow direction of the condensation liquid.

Commercial refrigerating plants as are employed, e.g., in supermarkets for preservation and deep cooling of articles for sale and foodstuffs typically have come to use $CO_2$ as the refrigerant in the colder regions. $CO_2$ is a natural coolant and may be favorably employed, while exerting a reasonable amount of technical expenditure, in a subcritical manner when the refrigerant is liquefied below the critical point in a two-phase region, i.e. at condensation temperatures below 30° C., and is also energetically advantageous over the F gas plants which have been used to date and work with fluorinated carbohydrates. In central Europe, $CO_2$ cannot be employed in a subcritical manner throughout the year since high outside temperatures during summer as well as heat transfer losses which occur will not allow subcritical operation. To ensure sufficient energetic process quality with such a $CO_2$ refrigerating plant during subcritical operation, a significant amount of technical expenditure is incurred, During supercritical operation, thermal output of the process occurs at a pressure above the critical point. This is why one also speaks of gas cooling since liquefaction of the refrigerant is no longer possible. During supercritical operation, the gas cooler pressures increase to more than 100 bar, and the high-pressure part of the $CO_2$ refrigerating plant including its heat transfer units may be dimensioned to suit said high pressures. In addition, larger and more powerful compressors or several compressors may be connected in parallel or in series. Eventually, additional components such as collectors and ejectors are employed which are partly still in the concept development phase and are to increase the plant's efficiency during supercritical operation.

FIG. 9 shows a $CO_2$ cascade plant 20. With such cascade plants using the refrigerant $CO_2$, $CO_2$ is used as the refrigerant for the lower temperature stage 22, and refrigerants having high global warming potentials such as $NH_3$, F gases or carbohydrates, for example, are used for a upper temperature stage 24. The entire re-cooling heat of the $CO_2$ process is here received by the evaporator of the process of the upper temperature stage 24.

By means of the process of the upper temperature stage 24, the temperature level is subsequently increased to such an extent that output of heat to the environment may be effected by the liquefier. Sole operation of the $CO_2$ plant is not possible with this wiring, and the refrigerating circuit of the upper temperature stage 24 is not capable, in terms of components, to implement arbitrarily small temperature elevations.

What is also disadvantageous about the concept described in FIG. 9 is the fact that the working media for the second heat pump stage have high global warming potentials.

What is also problematic is the fact that due to the cascade connection of the two heat pump arrangements in FIG. 9, the entire refrigerating capacity (refrigerating output) of the $CO_2$ cycle is transported onward by the $NH_3$ cycle. As a result, it is useful that the entire output which is achieved by the first heat pump arrangement having $CO_2$ as its working medium be effected once again by the second heat pump arrangement having $NH_3$ as its working medium.

Therefore, as was already set forth, the focus has often been on using a one-stage $CO_2$ plant, despite the problems involved in critical temperatures. Said $CO_2$ plant operates at very high pressures of more than 60 bar. When considering a refrigerating plant in a supermarket, for example, this means that the heat dissipation, i.e., cold production, takes place within the evaporator positioned, for example, within an engineering room together with the compressor. The compressed $CO_2$ working gas, however, is then directed, within high-pressure lines, through the entire supermarket and onto a re-cooler which may also be high-pressure resistant. There, energy from the compressed CO2 gas is discharged to the environment, so that liquefaction takes place. The liquefied CO2 gas, which is still under a high pressure, is then typically redirected, via high-pressure lines, from the re-cooler back into the engineering room, where relaxation takes place via a throttle, and where the relaxed CO2 working medium is reintroduced into the evaporator, which is also under considerable pressure, where evaporation takes place again so as to once re-cool a CO2 return flow from the refrigerating system of the supermarket.

Refrigeration engineering thus involves a relatively large amount of expenditure, specifically not only with regard to the heat pump plant within the engineering room, but also because of the technology of lines leading through the supermarket, and because of the re-cooler, which may be configured for very high pressures. On the other hand, said installation is advantageous in that the impact of CO2 on the climate is small as compared to other media and that CO2 at the same time is non-toxic to humans, at least in reasonable amounts.

SUMMARY

According to an embodiment, a heat pump system may have: a first heat pump arrangement configured to operate with a first heat pump medium including CO2; a second heat pump arrangement configured to operate with a second heat pump medium including water, wherein the second heat pump arrangement includes an input portion, an evaporator, a liquefier, and an output portion, the input portion being coupled to the evaporator of the second heat pump arrangement, and the output portion being coupled to the liquefier of the second heat pump arrangement, wherein the second heat pump arrangement includes a controller configured to control, as a function of a temperature prevailing at the input portion or of a temperature prevailing at the output portion, such that consumption of electric power by the second heat pump arrangement increases as the temperature prevailing at the input portion or at the output portion increases, and decreases as the temperature prevailing at the input portion or the output portion decreases, and wherein the second heat pump arrangement includes a turbocompressor having a radial impeller, a rotational speed of the radial impeller being controllable as a function of the temperature prevailing at the input portion or of the temperature prevailing at the output portion; and a coupler for thermally coupling the first heat pump arrangement to the second heat pump arrangement, said coupler including a first heat exchanger having a primary side and a secondary side, the secondary side of the first heat exchanger being coupled to the evaporator of the second heat pump arrangement via the input portion, and the primary side of the first heat exchanger being coupled to the first heat pump arrangement, and said coupler including a second heat exchanger having a primary side and a secondary side, the secondary side of the second heat exchanger being coupled to the liquefier of the second heat pump arrangement via the output portion, and the primary side of the second heat exchanger being coupled to the first heat pump arrangement.

According to another embodiment, a method of producing a heat pump system including a first heat pump arrangement configured to operate with a first heat pump medium including CO2, and including a second heat pump arrangement configured to operate with a second heat pump medium including water, wherein the second heat pump arrangement includes an input portion, an evaporator, a liquefier, and an output portion, the input portion being coupled to the evaporator of the second heat pump arrangement, and the output portion being coupled to the liquefier of the second heat pump arrangement, wherein the second heat pump arrangement includes a controller configured to control, as a function of a temperature prevailing at the input portion or of a temperature prevailing at the output portion, such that consumption of electric power by the second heat pump arrangement increases as the temperature prevailing at the input portion or at the output portion increases, and decreases as the temperature prevailing at the input portion or the output portion decreases, and wherein the second heat pump arrangement includes a turbocompressor having a radial impeller, a rotational speed of the radial impeller being controllable as a function of the temperature prevailing at the input portion or of the temperature prevailing at the output portion, may have the steps of: thermally coupling the first heat pump arrangement and the second heat pump arrangement to a coupler, said coupler including a first heat exchanger having a primary side and a secondary side, the secondary side of the first heat exchanger being coupled to the evaporator of the second heat pump arrangement via the input portion, and the primary side of the first heat exchanger being coupled to the first heat pump arrangement, and the coupler including a second heat exchanger having a primary side and a secondary side, the secondary side of the second heat exchanger being coupled to the liquefier of the second heat pump arrangement via the output portion, and the primary side of the second heat exchanger being coupled to the first heat pump arrangement.

According to another embodiment, a method of operating a heat pump system may have the steps of: operating a first heat pump arrangement having a first heat pump medium including CO2; operating a second heat pump arrangement having a second heat pump medium including water, wherein the second heat pump arrangement includes an input portion, an evaporator, a liquefier, and an output portion, the input portion being coupled to the evaporator of the second heat pump arrangement, and the output portion being coupled to the liquefier of the second heat pump arrangement, wherein the second heat pump arrangement includes a turbocompressor having a radial impeller; thermally coupling the first heat pump arrangement to the second heat pump arrangement with a coupler, said coupler including a first heat exchanger having a primary side and a secondary side, the secondary side of the first heat exchanger being coupled to the evaporator of the second heat pump arrangement via the input portion, and the primary side of the first heat exchanger being coupled to the first heat pump arrangement, and the coupler including a second heat exchanger having a primary side and a secondary side, the secondary side of the second heat exchanger being coupled to the liquefier of the second heat pump arrangement via the output portion, and the primary side of the second heat exchanger being coupled to the first heat pump arrangement; and controlling a rotational speed of the radial impeller as a function of a temperature prevailing at the input portion or of a temperature prevailing at the output portion, so that consumption of electric power by the second heat pump arrangement increases as the temperature prevailing at the input portion or at the output portion increases, and decreases as the temperature prevailing at the input portion or the output portion decreases.

According to the invention, at least one of the above-mentioned disadvantages of conventional technology is eliminated. In a first aspect, a CO2 heat pump arrangement is coupled to a heat pump arrangement having water as the working medium. Said coupling takes place via a coupler for thermally coupling the two heat pump plants. Utilization of water as the working medium has several advantages, One advantage consists in that water requires no high pressures for operating within a heat pump cycle configured for the above-mentioned temperatures. Instead, relatively low pressures arise, which, however, need to prevail, depending on the implementation, only within the heat pump arrangement operating with water as the working medium, whereas a separate cycle may readily be used which leads to the re-cooler of a refrigerating system, which re-cooler may operate at different pressures and with working media other than $CO_2$ or water.

A further advantage consists in that by using a heat pump arrangement using water as the working medium, it is possible to ensure, with a limited amount of expenditure in terms of energy, that the $CO_2$ heat pump arrangement operates below the critical point. The temperatures under 30° C. or even under 25° C. which may be used for this may readily be provided by the second heat pump arrangement, which operates with water. With $CO_2$ heat pumps, temperatures of, say, 70° C. typically arise downstream from the compressor. Cooling down from 70° C. to, e.g., 25 or 22° C. represents a temperature range which may very efficiently be accomplished by using a heat pump operating with water as the working medium.

In accordance with an alternative or additional aspect, coupling of the second heat pump arrangement to the first heat pump arrangement takes place via the coupler for thermal coupling of the two heat pump arrangements. Here, the coupler includes a first heat exchanger and a second heat exchanger. The first heat exchanger is connected to the input portion of the second heat pump arrangement, and the second heat exchanger is connected to the output portion of the second heat pump arrangement.

Irrespective of whether $CO_2$ is used as the working medium in the first heat pump arrangement and irrespective of whether water is used as the working medium in the second heat pump arrangement, said double coupling results in significantly more efficient heat transfer from the first heat pump arrangement to an environment, said heat transfer being accomplished, for example, via a further cycle comprising a re-cooler. A reduction of the temperature level of the compressed working vapor of the first heat pump arrangement is achieved as early as during the output-side cycle of the second heat pump arrangement. Said initially cooled medium will then be fed into the input-side cycle of the second heat pump arrangement, where it finally will be cooled to the target temperature. Said two-stage coupling results in that self-regulation takes place, as it were. Since the thermal coupler initially comprises the first heat exchanger, which is connected to the output circuit of the second heat pump arrangement, cooling, by a specific amount, of the compressed working medium of the first heat pump arrangement takes place, for which essentially no energy needs to be expended on the part of the second heat pump arrangement. The second heat pump arrangement need expend energy only for the remainder of the heat energy, which is not yet dissipated by the first heat exchanger, so as to then bring the working medium of the first heat pump arrangement to the target temperature via the input-side heat exchanger of the second heat pump arrangement.

In implementations, the heat exchanger connected to the output portion of the second heat pump arrangement additionally is connected to a re-cooler, advantageously via a third working-medium cycle. Thus, a favorable working pressure may be selected for the re-cooler cycle, namely, e.g., a relatively low pressure between 1 and 5 bar, and the medium in this cycle may be adapted to the specific needs, i.e., may comprise, for example, a mixture of water/glycol so as not to freeze even in winter. At the same time, all of the processes which are critical in terms of health or design take place within the engineering room of, e.g., a supermarket without there being a need to lay high-pressure lines within the supermarket itself. In addition, all of the potentially dangerous substances are also to be found only within the engineering room, in the event that problematic substances are used for the first heat pump arrangement and for the second heat pump arrangement or for one of both heat pump arrangements. Said problematic substances do not leave the engineering space and do not join a liquid cycle running, e.g., through the supermarket to the re-cooler and back from there.

In specific implementations, what used for the second heat pump arrangement is a heat pump arrangement comprising a turbocompressor operated, e.g., with a radial impeller. By varying the rotational speed of the radial impeller in a relatively continuous manner, a refrigerating capacity (cooling capacity) of the second heat pump arrangement may be set, which will automatically adapt exactly to the actual requirements. Such an approach is not readily achievable by means of a conventional reciprocating compressor as may be used e.g., in the first heat pump arrangement, when $CO_2$ is used as the working medium or when any other medium is used as the working medium. By contrast, a heat pump arrangement that is continuously variable, as it were, such as a heat pump arrangement comprising a turbocompressor advantageously having a radial impeller, will enable optimum and particularly efficient adaptation to the actual refrigeration need. For example, if the ambient temperature to which the re-cooler is coupled is sufficiently low that the first heat pump plant is sufficient and is operated, in the event of using $CO_2$, within the subcritical range, the second heat pump arrangement will not have to provide any refrigeration output, in an embodiment, and will therefore not consume any electrical power. By contrast, if the outside temperatures in which the re-cooler is arranged lie within an intermediate range, there will be an automatic shift, caused by the coupling, of the thermal output which may be used in terms of percentage, from the second heat exchanger to the first heat exchanger, i.e., to the input side of the second heat pump arrangement. Depending on the implementation of the second heat pump arrangement, which may be operated as a multi-stage heat pump arrangement with or without a free-cooling mode, there will be optimum adaptation to the effect that the second heat pump arrangement will consume only so much energy as may actually be used for supporting the first heat pump arrangement and, in the example of $CO_2$, for operating within the subcritical range.

However, the wiring on the input side and on the output side is beneficial not only for the combination of $CO_2$ as the working medium, on the one hand, and water as the working medium, on the other hand, but may also be employed for any other applications wherein other working media are employed which may become supercritical within the temperature ranges which may be used. In addition, specific coupling of a self-adapting second heat pump arrangement to a first heat pump arrangement will be of particular advantage when the first heat pump arrangement is designed and configured such that it is not or only roughly controllable, i.e., that it will operate at its best and most efficiently when it generates the same amount of thermal output all the time. In one application, wherein said heat pump arrangement should actually produce variable thermal output, optimum coupling to the second heat pump arrangement takes place on the input side and on the output side, so that the second heat pump arrangement, which may be regulated, or controlled, more finely than the first heat pump arrangement and may advantageously be regulated, or controlled, in a continuous manner, need only ever exert the load that may actually be used. The base load, or constant load or load that can be set roughly only will thus be supplied by the first heat pump arrangement, and the variable part, which goes beyond the former, will be supplied, in a manner in which it is variably controlled, by the second heat pump arrangement, irrespective of whether the first heat pump arrangement or the second heat pump arrangement operate with CO2 or water as the working medium.

In addition, it shall be noted that in a particularly advantageous embodiment, the first heat pump arrangement is operated with CO2, the second heat pump arrangement is operated with water as the working medium, and the coupling of the two heat pump arrangements takes place via the first and second heat exchangers, i.e., on the input side and on the output side.

BRIEF DESCRIPTION OF THE DRAWINGS

Embodiments of the present invention will be detailed subsequently referring to the appended drawings, in which:

FIG. 2C shows a block diagram of an embodiment with CO2 as the first working medium and water as the second working medium and with input-side and output-side wiring;

FIG. 7A shows a table for depicting the operating conditions of various components in the different modes of operation;

FIG. 7B shows a table for depicting the operating conditions of the two coupled controllable 2×2-way switches;

FIG. 7C shows a table for depicting the temperature ranges for which the modes of operation are suitable;

FIG. 7D shows a schematic representation of the coarse/fine control over the modes of operation, on the one hand, and the speed control, on the other hand;

DETAILED DESCRIPTION OF THE INVENTION

Figure 1A:
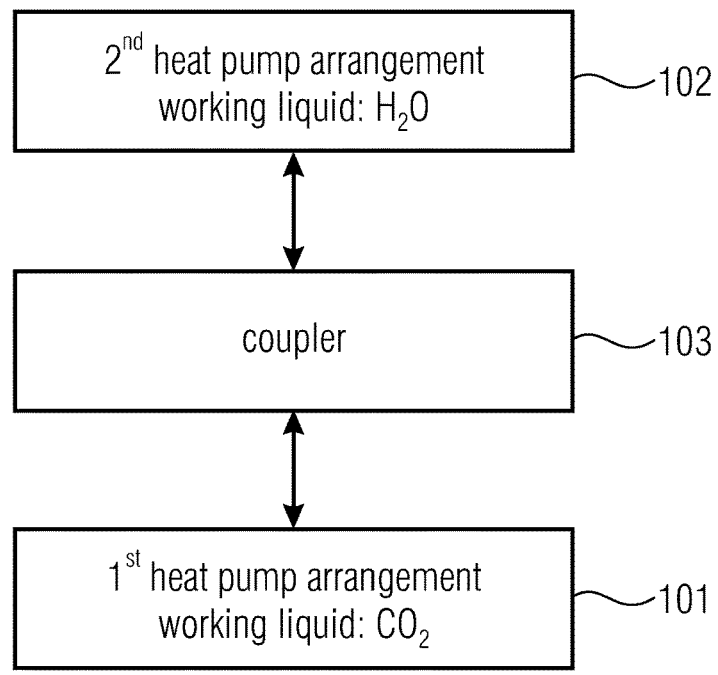
FIG. 1A shows a block diagram of a heat pump system comprising a first heat pump arrangement with CO2 and a second heat pump arrangement with water as the working medium in accordance with a first aspect.

FIG. 1A shows a heat pump system in accordance with a first aspect of the present invention which comprises a first heat pump arrangement 101 configured to operate with a first heat pump medium comprising CO2. In addition, the heat pump system includes a second heat pump arrangement configured to operate with a second heat pump medium comprising water (H2O). The second heat pump arrangement is referred to as 102. The first heat pump arrangement 101 and the second heat pump arrangement 102 are coupled via a coupler 103 for thermally coupling the first heat pump arrangement 101 and the second heat pump arrangement 102.

Figure 9:
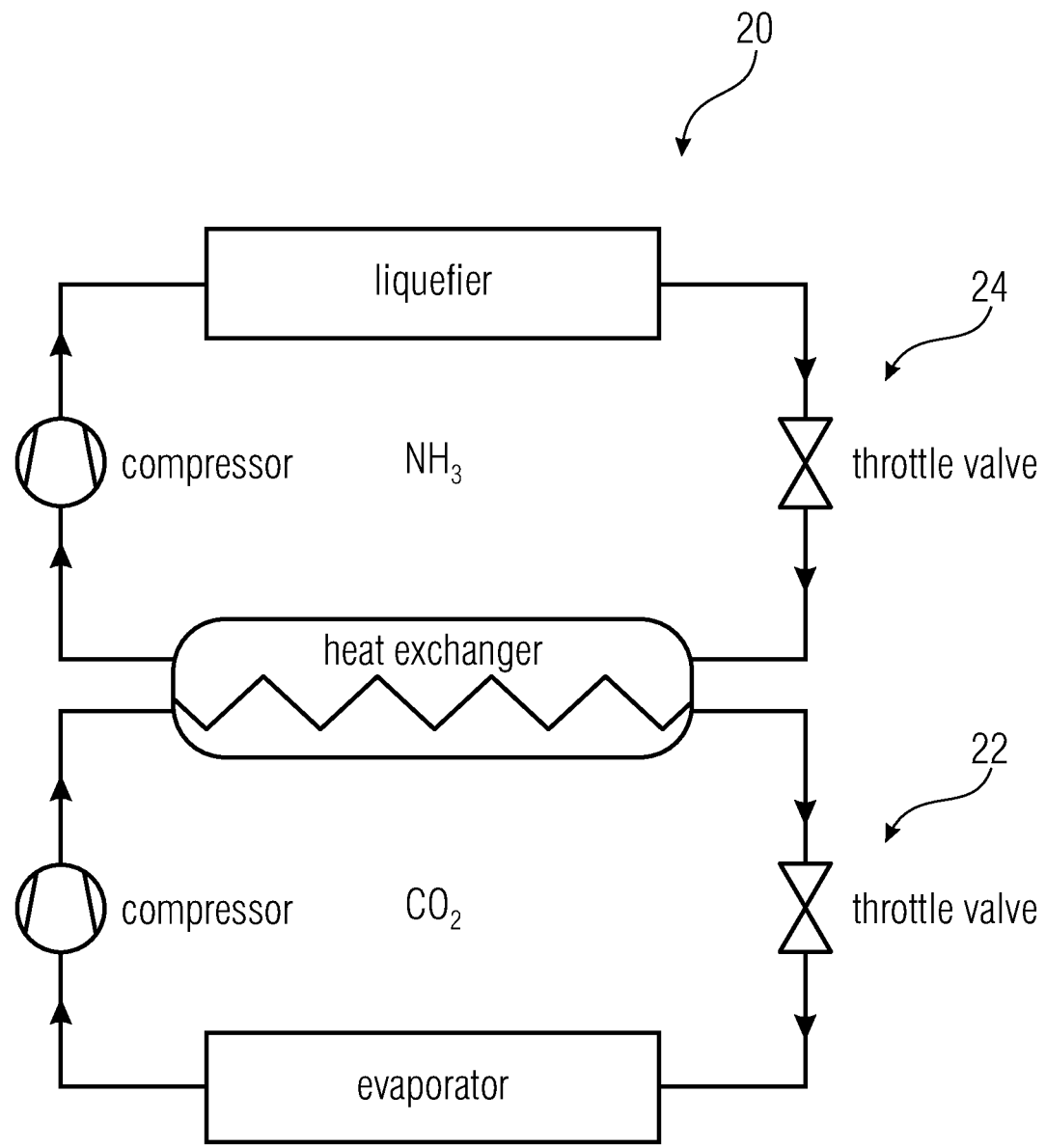
FIG. 9 shows a cascaded refrigerating plant with a CO2 heat pump arrangement and an NH3 heat pump arrangement.

The coupler may be implemented in any manner desired, specifically, e.g., like the heat exchanger of FIG. 9, in the sense that the liquefier of the first heat pump arrangement 101 is coupled to the evaporator of the second heat pump arrangement 102 via a heat exchanger. Alternatively, depending on the implementation, a different type of coupling may also take place, e.g., output-side coupling, to the effect that a compressor output of the first heat pump arrangement is coupled to a liquefier output of the second heat pump arrangement. In other embodiments, input-side and output-side coupling may also be employed, as is shown, e.g., in FIG. 1B for any heat pump media desired.

Figure 1B:
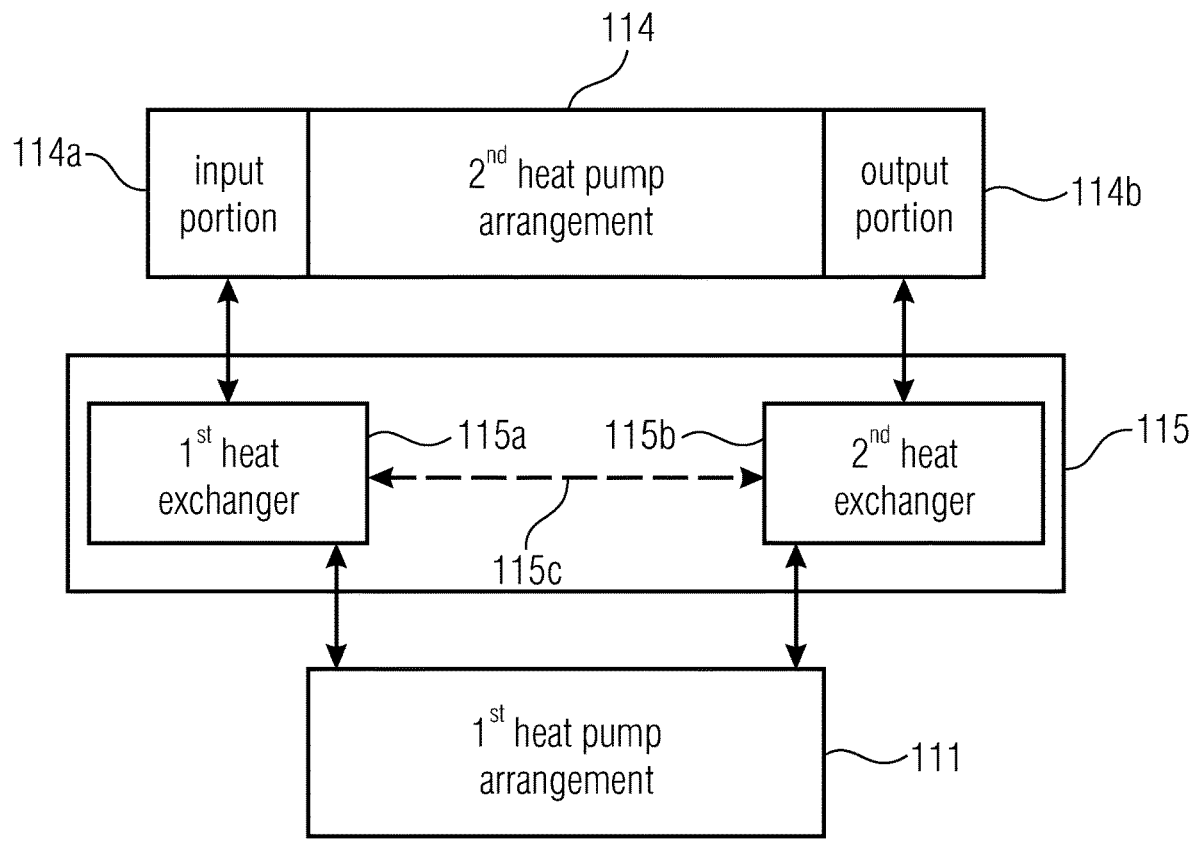
FIG. 1B shows a heat pump system in accordance with an alternative or additional second aspect, wherein the first heat pump arrangement and the second heat pump arrangement are coupled via a coupler comprising a first heat exchanger and a second heat exchanger.
Figure 2A:
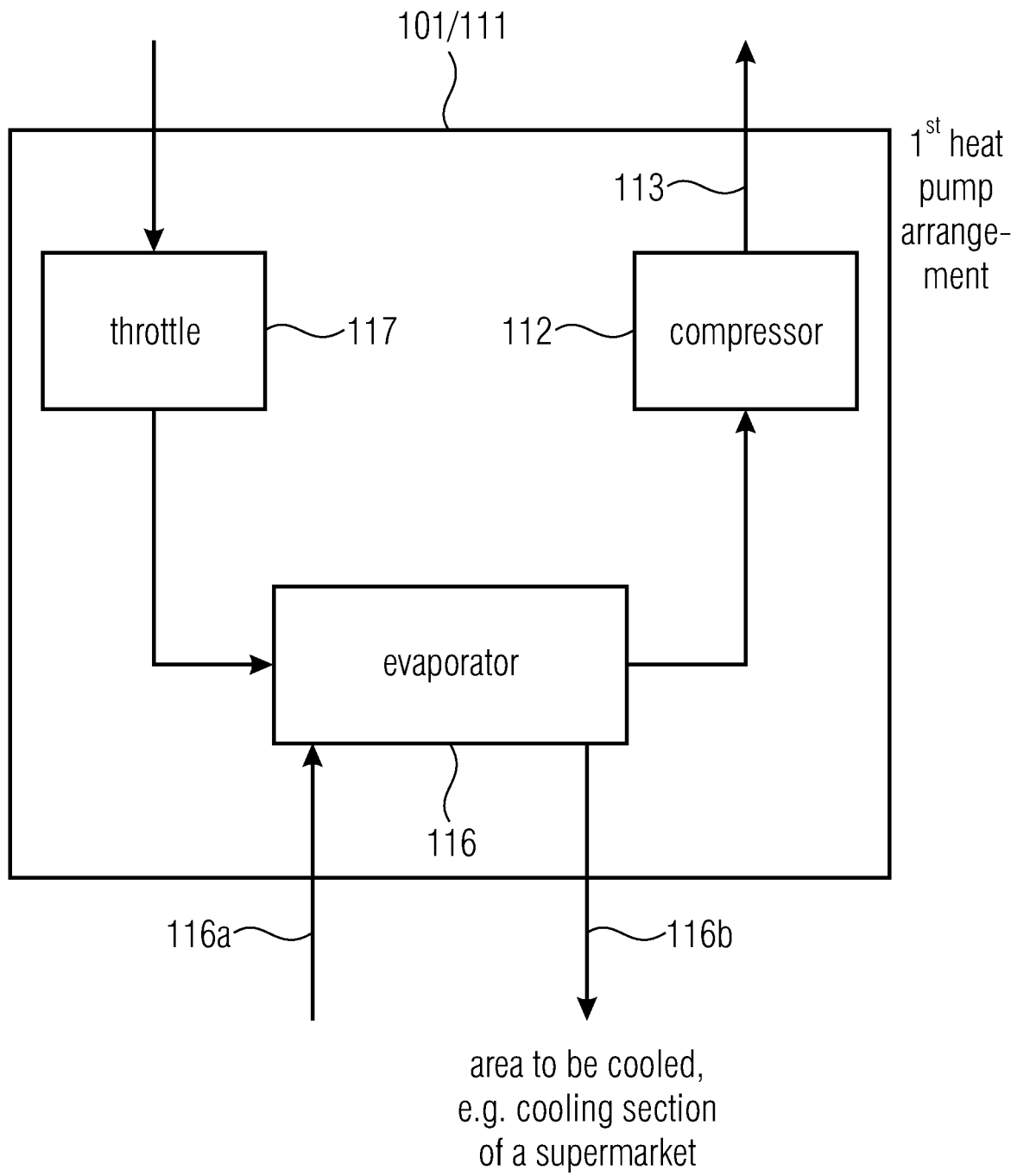
FIG. 2A shows a detailed representation of a first heat pump arrangement.

In accordance with a second aspect, FIG. 1B shows a first heat pump arrangement 111 comprising a compressor having a compressor output, a compressor being shown, e.g., at 112 in FIG. 2A, and the compressor output being depicted at 113 in FIG. 2A. In addition, the heat pump system of FIG. 1B includes a second heat pump arrangement 114 comprising an input portion 114a and an output portion 114b. In addition, a coupler 115 is provided for coupling the first heat pump arrangement 111 and the second heat pump arrangement 114 to each other. In the aspect shown in FIG. 1B, the coupler 115 includes a first heat exchanger 115a and a second heat exchanger 115b. The first heat exchanger 115a is connected to the input portion 114a of the second heat pump arrangement. Moreover, the second heat exchanger 115b is connected to the output portion 114b of the second heat pump arrangement. In one implementation, the two heat exchangers 115a, 115b may also be connected to each other, as shown at 115c.

FIG. 2A shows a more detailed representation of the first heat pump arrangement 101 or 111. In particular, the first heat pump arrangement includes, in the representation shown in FIG. 2A, an evaporator 116 and a throttle 117. Working liquid that has been liquefied in a liquefaction process to be explained below is fed into the throttle 117, and its pressure level is brought to the lower pressure level prevailing a the input of the evaporator 116.

The evaporator further includes an evaporator intake 116a via which a working liquid, which is to be cooled, of the first heat pump arrangement is fed into the evaporator 116. In addition, the evaporator 116 includes an evaporator drain 116b via which cooled working liquid is conveyed from the evaporator 116 into an area to be cooled, which for example is a cooling section in a supermarket. Depending on the implementation, the evaporator inlet, or intake, 116a and the evaporator outlet, or drain, 116b may be directly coupled to the area to be cooled or may be coupled to an area to be cooled via a heat exchanger, so that, in the example of CO2, the liquid CO2 does not circulate directly within corresponding lines in a cooling shelf but cools, via a heat exchanger, a different liquid medium which will then circulate within the corresponding lines of a cooling shelf or a freezer cabinet in a supermarket.

Figure 2B:
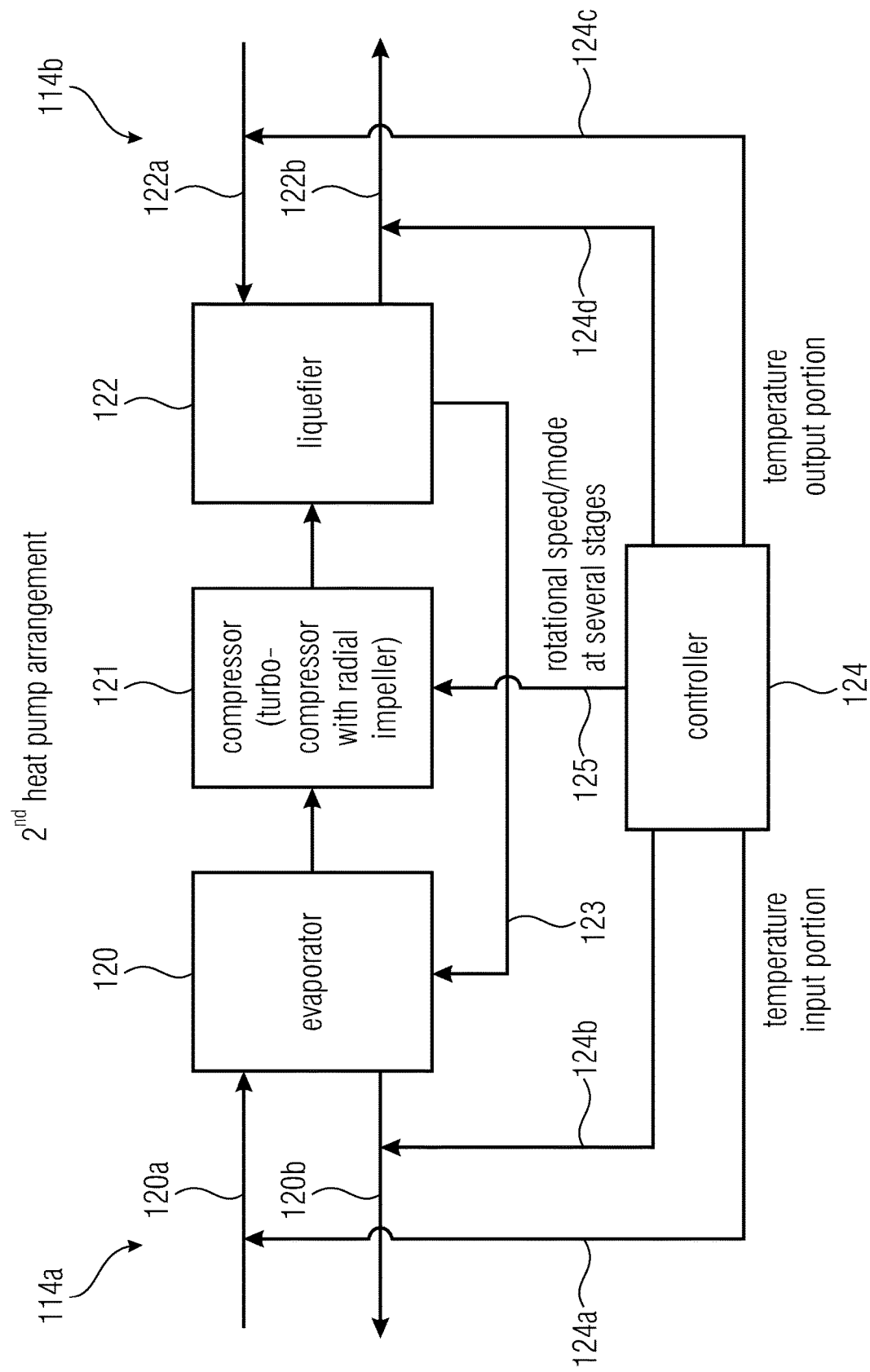
FIG. 2B shows a detailed representation of a second heat pump arrangement.

FIG. 2B shows an implementation of a second heat pump arrangement including an evaporator 120, a compressor 121 and a liquefier 122. The evaporator 120 includes an evaporator inlet 120a and an evaporator outlet 120b. Moreover, the liquefier 122 includes a liquefier inlet 122a and a liquefier outlet 122b. The evaporator-side end of the heat pump arrangement of FIG. 2B has the input portion 114a located thereat which is coupled to the first heat exchanger 115a of the coupler 115 of FIG. 1B, Furthermore, the liquefier-side end of the second heat pump arrangement, which is shown on the right-hand side in FIG. 2B by way of example, represents the output portion 114b. The liquefier 122 and the evaporator 120 are further connected to each other via a throttle 123 so as to return liquefied working liquid into the evaporator 120.

In advantageous embodiments, the second heat pump arrangement further includes a controller 124 configured to detect a temperature in the input portion 114a and/or a temperature in the output portion 114b. To this end, detection may take place within the evaporator intake 120a, as shown at 124a, or detection may take place within the evaporator drain 120b, as shown at 124b, temperature detection may take place within the liquefier intake 122a, as shown at 124c, or temperature detection may take place within the liquefier drain, as shown at 124d. Depending on the temperatures detected, the controller 124 is configured to control the compressor 121, which is advantageously a turbocompressor comprising a radial impeller. To this end, in a one-stage second heat pump arrangement, when there is a situation where more refrigeration output may be used, the rotational speed of the radial impeller within the compressor 121 is increased via a control line 125, or the operating mode is switched, as will be illustrated with regard to FIGS. 3A to 7D, so as to change from a low-performance mode (LPM) to a free-cooling mode (FCM) as the power increases, and to a medium-performance mode (MPM) as the power increases further, and to a high-performance mode (HPM) as the power increases further, and vice versa, in each case, as is depicted by means of FIG. 7D and will be explained below.

FIG. 2C shows a heat pump system wherein CO2 is used as the working medium in the first heat pump arrangement 101/111, whereas water is used as the working medium in the second heat pump arrangement 102/114. In heat-pump technology, water is also referred to as R718.

The first heat pump plant 101/111, which is referred to as a "CO2 refrigerating plant" in FIG. 2C, is thermally coupled to the second heat pump plant 102/114 via a coupler. In the embodiment shown in FIG. 2C, the coupler consists of the first heat exchanger 115a and the second heat exchanger 115b.

In addition, in the advantageous embodiment shown in FIG. 2C, a third cycle is provided which comprises an output-side heat exchanger 130 and a re-cooler 131. In the exemplary application scenario wherein the focus is on a supermarket, the re-cooler 131 is arranged on the roof or on the northern side in the shade of the supermarket building. A ventilator is typically arranged there which blows toward a liquid/air heat exchanger so as to achieve good heat transfer from the re-cooler 131 to the environment.

FIG. 2C shows exemplary temperatures. A CO2 gas that has been compressed and, for example, has a pressure of 70 bar and a temperature of 70° C. is fed into the second heat exchanger 115b. Exemplary output-side temperatures of the second heat exchanger 115b may be around 48° C. Via a connecting lead between the second heat exchanger 115b and the first heat exchanger 115a, which connecting lead is referred to as 115c in FIG. 2C and FIG. 1B, the CO2 which has already been cooled but is still gaseous flows into the first heat exchanger 115a, where it will then be output at a temperature of about 22° C. This means that actual liquefaction of the CO2 gas at the operating temperatures shown in FIG. 2C does not take place until it is within the first heat exchanger 115a, whereas cooling of the gas by more than 20° C. takes place within the second heat exchanger 115b already.

In the second heat pump arrangement 102/114, the medium used is water. Separating off the water cycle toward the outside takes place by the first heat exchanger 115a on the input side, and by the further heat exchanger 130 on the output side. Thus, it is possible that during the third cycle, or in the re-cooler cycle, yet a different pressure may be used, namely a pressure between 1 and 5 bar which can be easily handled. In addition, a water/glycol mixture is advantageously used as the medium during the third cycle. The output of the second heat exchanger 115b on the secondary side of the heat exchanger 115b is connected to an input 131a of the re-cooler 131. The output of the re-cooler, which only has a temperature of, e.g., 40° C. due to the output of heat to the environment and is referred to as 131b, passes through the further heat exchanger 130 and into a secondary-side input of the second heat exchanger 115b. The liquid medium circulating within the re-cooler cycle is made to reach a temperature of, e.g., 46° C. within the heat exchanger 130 due to the waste heat of the second heat pump arrangement. Here, the liquefier 122 of FIG. 2B, which is not specifically shown in FIG. 2C, is coupled to the further heat exchanger 130, for example. Alternatively and with reference to FIGS. 6A to 6D, the heat exchanger 130 in FIG. 2C corresponds to the heat exchanger WTW 214 of FIGS. 6A to 6D.

Thus, the re-cooler cycle is provided with waste heat both by the second heat pump arrangement 102/114 and by the first heat pump arrangement 101/111.

Figure 2D:
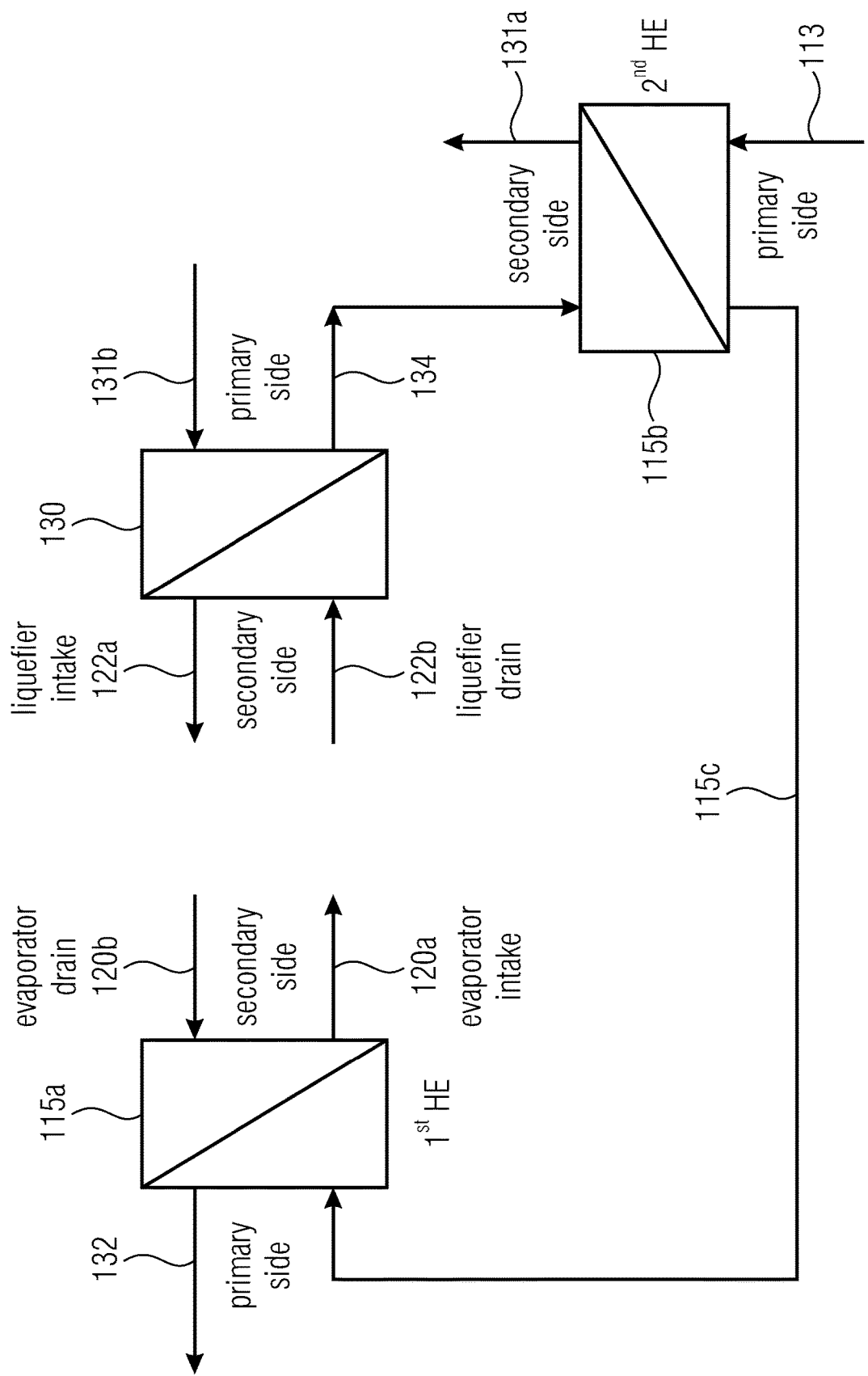
FIG. 2D shows a detailed representation of the coupler for thermal coupling in connection with a liquefier-side heat exchanger for a re-cooler cycle.

FIG. 2D shows a more detailed representation of the heat exchangers of FIGS. 1B and 2C, respectively. The first heat exchanger includes a primary side comprising a primary-side input 115c and a primary-side output 132. Moreover, the secondary side of the first heat exchanger 115a is connected to the evaporator of a one-stage heat pump or to respective change-over switches on an input side of the heat pump so as to be able to perform the various modes as are depicted in FIGS. 6A to 6D. Thus, the input portion of the second heat pump arrangement includes the evaporator drain 120b and the evaporator intake 120a, as is drawn in in FIG. 2D, in the event of a one-stage heat pump wherein only the rotational speed of the compressor is controllable but no mode switching is achievable. However, if a advantageously two-stage heat pump arrangement is used which has a first stage and a second stage and which may be operated, e.g., in two or more modes, e.g., up to four modes, as are depicted with reference to FIGS. 7A-7D, the input portion includes the lines 401, 230 connected to the "WTK", or "heat exchanger cold", which is referred to as 212 in FIGS. 6A to 6D. Additionally, the output portion will then include the lines 402, 340 connected to the "WTW", or "heat exchanger warm", which is referred to as 214 in FIGS. 6A to 6D.

In an advantageous implementation, in particular, the heat exchanger cold 212 in FIGS. 6A to 6D represents the heat exchanger 115a of FIG. 2D, and the second heat exchanger "WTW" 214 of FIGS. 6A to 6D represents the further heat exchanger 130 of FIG. 2D.

In one implementation, however, a further heat exchanger may be readily arranged between the heat exchanger WTK 212 of FIGS. 6A to 6D and the first heat exchanger 115a, or a further heat exchanger may be arranged between the heat exchanger WTW 214 of FIGS. 6A to 6D and the further heat exchanger 130 so as to further decouple the inner heat pump arrangement from the first heat exchanger and/or from the further heat exchanger and/or from the third cycle between the further heat exchanger 130 and the re-cooler 131 of FIG. 2C.

This means, therefore, that the first heat exchanger does not necessarily have the evaporator drain 120b and the evaporator intake 120a connected thereto but that, alternatively, the lines 401, 230 of FIGS. 6A to 6D, which, depending on the positions of the switches 421, 422, are connected to corresponding terminals/further lines so as to achieve different operating modes.

The output portion 114b of the second heat pump arrangement is formed by analogy therewith. The output portion need not necessarily be connected to the liquefier intake and to the liquefier drain but may be connected to the lines 402, 340 of FIGS. 6A to 6D which will then be coupled, depending on the state/switching mode, to corresponding other components via the change-over switches 421, 422, as may be seen in FIGS. 6A to 6D.

In addition, the second heat exchanger 115b also includes a primary side having a primary input 113 advantageously coupled to the compressor output 113 of the first heat pump arrangement and a primary-side output 115c coupled to a primary-side input of the first heat exchanger 115a.

The secondary side of the second heat exchanger includes a secondary-side input 134 coupled to a primary-side output of the further heat exchanger 130. The secondary-side output 131a of the second heat exchanger 115b in turn is connected to an input 131a of the re-cooler 131. The output 131b of the re-cooler in turn is connected to the primary-side input of the further heat exchanger 130, as depicted in FIG. 2D.

As was already set forth, the inventive heat pump systems in accordance with both aspects achieve that in particular a refrigerating plant, i.e., a heat pump system for cooling, is designed in as simple a manner as possible, so that the disadvantages of harmfulness a the environment, dangerousness, performance efficiency or instrumental setup are at least partially eliminated individually or in combination.

To this end, a refrigerating plant in accordance with the first aspect with regard to cascading of $CO_2$ and water is employed, or a heat pump system in accordance with the second aspect, wherein input-side and output-side coupling of two heat pump stages operated with any working media desired are achieved; advantageously, both aspects are employed in combination, so that, consequently, coupling of the $CO_2$ heat pump and the water heat pump takes place via an input-side heat exchanger and an output-side heat exchanger.

Embodiments of the present invention achieve that efficient operation of the $CO_2$ refrigerating plant is effected at high ambient temperatures of, e.g., more than 30° C., and that, contrary to what conventional technology suggests, no solutions are required which involve a large amount of technical expenditure. Instead, in the event of high outside temperatures, pre-cooling, which may be implemented with little expenditure, is employed.

To this end, in accordance with one aspect, the $CO_2$ refrigerating plant is thermally coupled, for heat dissipation purposes, to a refrigerating system with water as the refrigerant. The $CO_2$ refrigerating plant is thermally coupled to the refrigerating system by means of a heat transfer unit. In this manner, heat dissipation from the $CO_2$ refrigerating plant and, therefore, effective pre-cooling may be achieved in a manner which is simple in terms of design.

Thus, It is achieved that condensation temperatures may be reduced to below 25° C., so that the $CO_2$ process is implemented in a subcritical and therefore simultaneously efficient manner throughout the year. Solutions involving a large amount of technical expenditure, such as additional or powerful compressors and/or further components which render the $CO_2$ refrigerating plant more complicated, may thus be dispensed with, and re-cooling of the overall plant is effected, throughout the year, at a pressure as typically prevails, in such plants, within the re-cooling cycle comprising water or within a water/re-cooling mixture, depending on the temperature of the installation location. The overall plant may thus be implemented in a compact manner and with a small $CO_2$ filling quantity.

This solution results in a compact overall system wherein the entire re-cooling heat is discharged to the environment via water or a water/brine mixture. The cooler of the $CO_2$ process consists of the two heat exchangers 115a, 115b; at low outside temperatures, the entire re-cooling outputs are transferred initially, e.g., by the heat transfer unit through which the $CO_2$ flows, i.e., by the second heat transfer unit 115b, to the re-cooling cycle comprising the re-cooler 131 of FIG. 2C. As temperatures within the re-cooling cycle increase, heat from the $CO_2$ cycle is also dissipated within the first heat transfer unit, i.e., the first heat exchanger 115a, which is coupled to the second heat pump arrangement 102/114 for pre-cooling so that a temperature of, e.g., 22° C. downstream from the first heat transfer unit is never exceeded, as depicted in FIG. 2C by way of example.

As the temperature within the re-cooling cycle increases, the re-cooling capacity shifts from the second heat transfer unit, through which the medium flows, to the first one. When temperatures within the re-cooling cycle enable achieving the 22° C. temperature already downstream from the second heat transfer, the second heat pump stage 102/114 for pre-cooling purposes switches off completely. This means that due to integrating the pre-cooling, which is suggested here, it is possible to operate the entire plant in an energetically optimum manner which involves a minimum amount of expenditure in terms of energy.

In advantageous embodiments, provision is made to thermally couple the refrigerating system to the compressor of the CO2 refrigerating plant via the thermal coupler, and in particular via the second heat exchanger 115b, such that the compressed and, therefore, overheated CO2 vapor of the first heat pump plant is cooled and will eventually be liquefied, for example, by the heat exchanger 115a of FIG. 2C.

As compared to the standard process, therefore, the overheated vapor is pre-cooled following the CO2 compressor stage, e.g., the stage 112 of FIG. 2C. With high outside temperatures as occur during the summer, about 50% of the re-cooling heat of the CO2 process are dissipated as de-heating heat to the water cycle or water/glycol cycle within which the re-cooler 131 is arranged, and to the heat sink, i.e., to the environment, for example. The re-cooling output of the proposed refrigerating plant may be effected in parallel to or prior to feed-in by means of the CO2 process.

If the temperatures decrease within the water/glycol cycle due to the weather, the dissipated re-cooling and/or de-heating output of the CO2 process during pre-cooling increases, and the output, which may be used, of the first heat pump arrangement increases. Accordingly, temperature feeding between the heat-receiving and the heat-discharging sides of the refrigerating machine decreases. For this purpose, utilization of turbocompressors as depicted, e.g., at 121 in FIG. 2B is particularly advantageous since the rotational speed influences the refrigerating capacity and the pressure/generated temperature difference. As the rotational speed increases, both the output and the generated temperature difference increase.

In order to be able to benefit from the advantages of turbocompression in the field of use of pre-cooling also at relatively small refrigerating capacities, i.e., at refrigeration capacities between 30 kW and 300 kW, water (R718) is ideally suited as the refrigerant. Due to the low volumetric refrigerating capacity, utilization of fluid flow machines is possible already at relatively small capacities of below 50 kW. The second heat pump arrangement is advantageously configured to provide thermal outputs of less than 100 kW.

FIG. 2C schematically shows the second heat pump stage 102/114 as pre-cooling, which is configured as a refrigerating plant using water as the refrigerant. Advantageously, the eChiller by Efficient Energy GmbH is used as the refrigerating plant. The eChiller which is used has a maximum refrigerating output of 40 kW in one design and enables, during introduction into the CO2 process for dissipating the condensation heat, a CO2 process which may be operated in a subcritical manner throughout the year and has a total re-refrigerating capacity of up to 80 kW. Higher capacities may be implemented by switching several refrigerating plants for pre-cooling in parallel. For thermally coupling the refrigerating plant 102/114 to the CO2 refrigerating plant 101/111, the heat transfer unit, or thermal coupler, 115, is provided which includes the first exchanger 115a and the second heat exchanger 115b, which is advantageously coupled to the compressor 112 of the CO2 refrigerating plant. As a result, the overheated vapor from the CO2 process is pre-cooled. The present invention in accordance with the described embodiment is advantageous in the sense that heat recovery is also easy to implement in that the de-heating heat of the CO2 process is not discharged to the environment via the re-cooler 131 but is discharged into a useful heat sink. In this case, the re-cooler would be arranged in an environment where the waste heat may be employed in a profitable manner.

FIGS. 3A-7D, which show two- and/or multi-stage heat pump arrangements as are implemented in the eChiller, for example, will be addressed below. In the descriptions to the figures which follow, the second heat pump arrangement of FIGS. 1A to 2C will also be referred to as a heat pump plant.

Figure 3A:
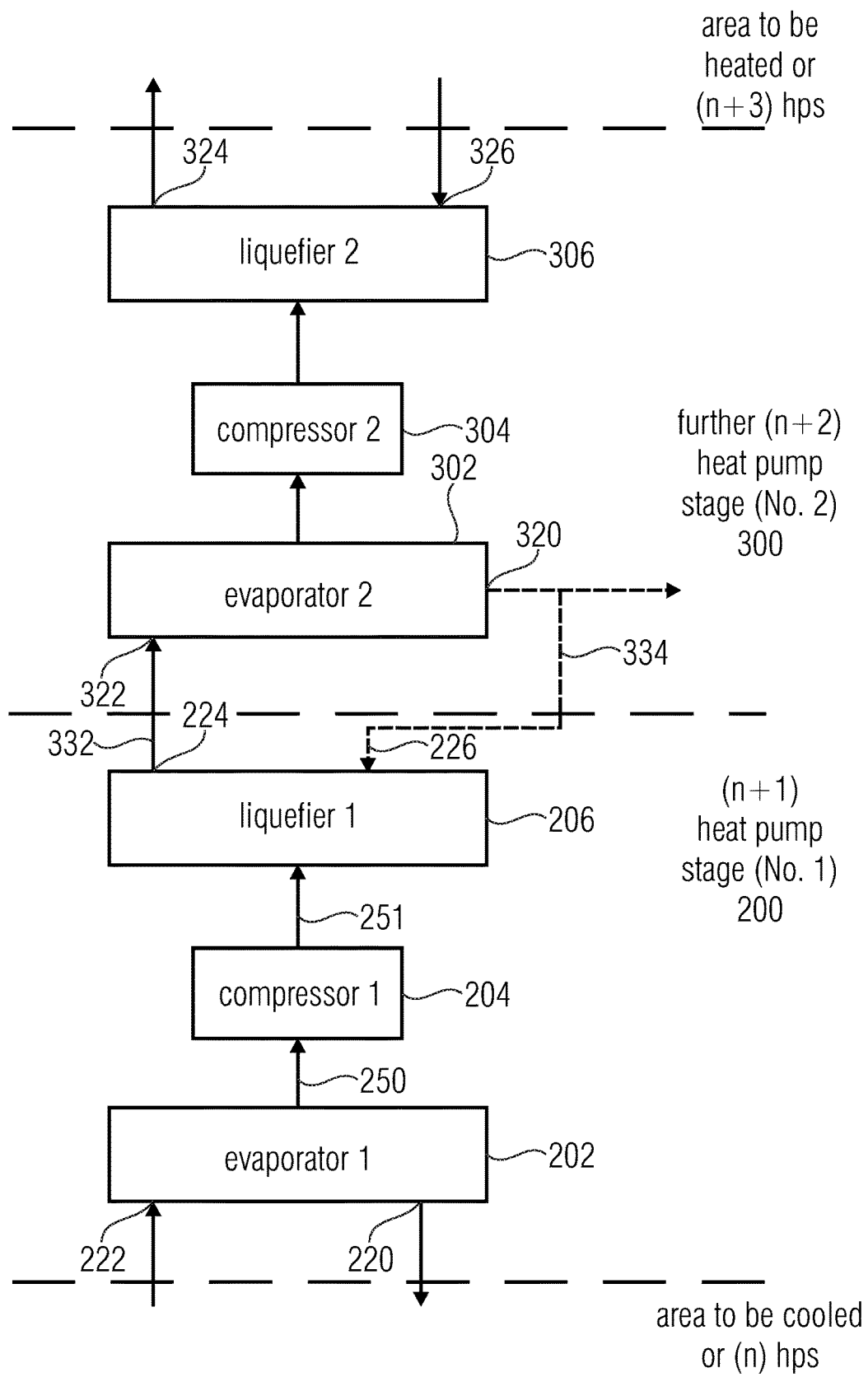
FIG. 3A shows a schematic representation of a heat pump system comprising a first and further cascaded heat pump stages.

FIG. 3A shows such a heat pump plant, which heat pump plant and/or second heat pump arrangement 102, 114 may comprise any arrangement of pumps or heat exchangers.

In particular, a heat pump system as shown in FIG. 3A includes a heat pump stage 200, i.e. the stage n+1 comprising a first evaporator 202, a first compressor 204, and a first liquefier 206, the compressor 202 being coupled to the compressor 204 via the vapor channel 250, and as soon as the compressor 204 is coupled to the liquefier 206 via the vapor channel 251. It is advantageous to use the interleaved arrangement again; however, any arrangements may be used in the heat pump stage 200. The entrance 222 into the evaporator 202 and the exit 220 from the evaporator 202 are connected, depending on the implementation, either to an area to be cooled or to a heat exchanger, e.g. the heat exchanger 212, to the area to be cooled or to a further heat pump stage arranged in front of the latter, namely, e.g., the heat pump stage n, n being an integer larger than or equal to zero.

Additionally, the heat pump system in FIG. 3A includes a further heat pump stage 300, i.e. the stage n+2, comprising a second evaporator 302, a second compressor 304, and a second liquefier 306. In particular, the exit 224 of the first liquefier is connected to an evaporator entrance 322 of the second evaporator 320 via a connecting lead 332. The exit 320 of the evaporator 302 of the further heat pump stage 300 may be connected, depending on the implementation, to the inlet into the liquefier 206 of the first heat pump stage 200, as shown by a dashed connecting lead 334. However, as depicted by FIGS. 4A, 6A to 6D, and 5, the exit 320 of the evaporator 302 may also be connected to a controllable way module so as to achieve alternative implementations. However, due to the fixed connection of the liquefier exit 224 of the first heat pump stage to the evaporator entrance 332 of the further heat pump stage, a cascade connection is generally achieved.

Said cascade connection ensures that each heat pump stage may operate at as small a temperature spread as possible, i.e. at as small a difference as possible between the heated working liquid and the cooled working liquid. By connecting such heat pump stages in series, i.e. by cascading such heat pump stages, one achieves that a sufficiently large total spread is nevertheless achieved. Thus, the total spread is subdivided into several individual spreads. The cascade connection is of particular advantage in particular since it enables substantially more efficient operation. The consumption of compressor power for two stages, each of which has to accomplish a relatively small temperature spread, is smaller than the evaporator power used for one single heat pump stage which may achieve a large temperature spread. In addition, from a technical point of view the requirements placed upon the individual components are smaller in the event of there being two cascaded stages.

Figure 3B:
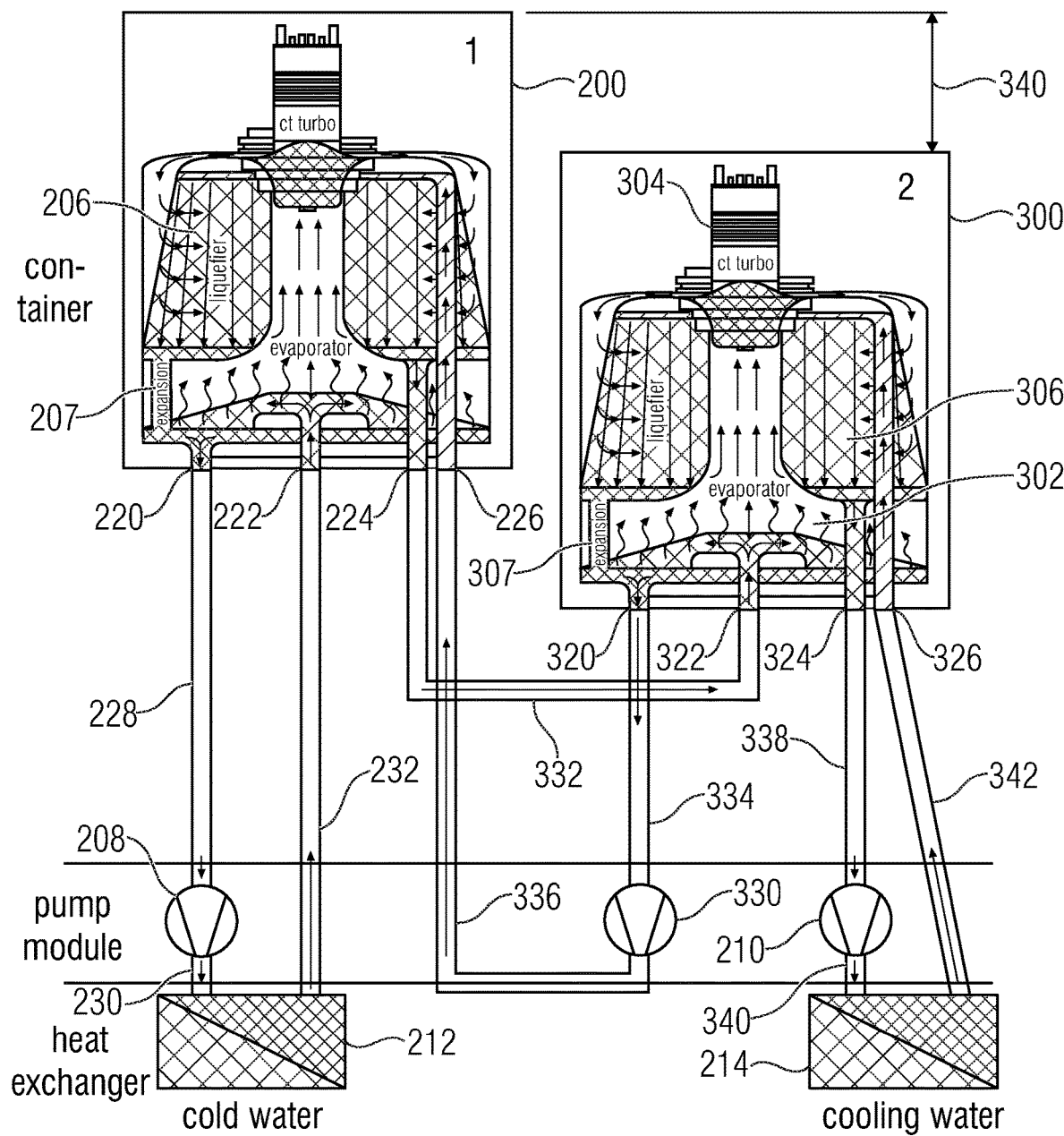
FIG. 3B shows a schematic representation of two firmly cascaded heat pump stages.

As shown in FIG. 3A, the liquefier exit 324 of the liquefier 306 of the further heat pump stage 300 may be coupled to the area to be heated, as is depicted, e.g., with reference to FIG. 3B by means of the heat exchanger 214. However, alternatively, the exit 324 of the liquefier 306 of the second heat pump stage may again be coupled to an evaporator of a further heat pump stage, i.e. the (n+3) heat pump stage, via a connecting pipe. Thus, depending on the implementation, FIG. 3A shows a cascade connection of, e.g., four heat pump stages if n=1 is assumed. However, if n is assumed to be any number, FIG. 3A shows a cascade connection of any number of heat pump stages, wherein, in particular, the cascade connection of the heat pump stage (n+1), designated by 200, and of the further heat pump stage 300, designated by (n+2), is set forth in more detail, and wherein the n heat pump stage as well as the (n+3) heat pump stage may be implemented as a heat exchanger or as an area to be cooled and/or to be heated, respectively, rather than as a heat pump stage.

As is depicted in FIG. 3B, for example, the liquefier of the first heat pump stage 200 is advantageously arranged above the evaporator 302 of the second heat pump stage, so that the working liquid flows through the connecting lead 332 due to gravity. In particular in the specific implementation, shown in FIG. 3B, of the individual heat pump stages, the liquefier is arranged above the evaporator anyway. Said implementation is particularly favorable since even with mutually aligned heat pump stages, the liquid already flows out of the liquefier of the first stage and into the evaporator of the second stage through the connecting lead 332. However, it is additionally advantageous to achieve a difference in height which includes at least 5 cm between the upper edge of the first stage and the upper edge of the second stage. Said dimension, which is shown at 340 in FIG. 3B, however advantageously amounts to 20 cm since in this case, optimum transport of water takes place, for the implementation described, from the first stage 200 to the second stage 300 via the connecting lead 332. In this manner one also achieves that no specific pump is required within the connecting lead 332. Therefore, said pump is saved. Only the intermediate-circuit pump 330 may be used so as to bring the working liquid from the exit 320 of the evaporator of the second stage 300, which is arranged to be lower than the first stage, back into the condenser of the first stage, i.e. into the entrance 226. To this end, the exit 320 is connected to the suction side of the pump 330 via the conduit 334. The pumping side of the pump 330 is connected to the entrance 226 of the condenser via the pipe 336. The cascade connection, shown in FIG. 3B, of the two stages corresponds to FIG. 3A comprising the connection 334. Advantageously, the intermediate-circuit pump 330 is arranged at the bottom, just like the other two pumps 208 and 210, since in this case, cavitation may also be prevented within the intermediate-circuit line 334 since sufficient dynamic pressure of the pump is achieved due to the intermediate-circuit pump 330 being positioned within the downpipe 334.

Even though FIG. 3B shows the configuration in accordance with the first aspect, i.e. where the heat exchangers 212, 214 are arranged below the pumps 208, 210 and 330, it is also possible to use the arrangement where the pumps 208, 210 are placed next to the heat exchangers 212, 214, as was set forth in accordance with the second aspect.

As is shown in FIG. 3B, the first stage includes the expansion element 207, and the second stage includes an expansion element 307. However, since working liquid exits from the liquefier 206 of the first stage via the connecting lead 332 anyway, the expansion element 207 may be dispensed with. By contrast, the expansion element 307 in the bottommost stage is advantageously used. Thus, in one embodiment, the first stage may be designed without any expansion element, and an expansion element 307 is provided in the second stage only. However, since it is advantageous to build all stages in an identical manner, the expansion element 207 is provided also in the heat pump stage 200. If said expansion element 207 is implemented to support nucleate boiling, the expansion element 207 will also be helpful despite the fact that it may possibly not direct any liquefied working liquid, but only heated vapor, into the evaporator.

Figure 5:
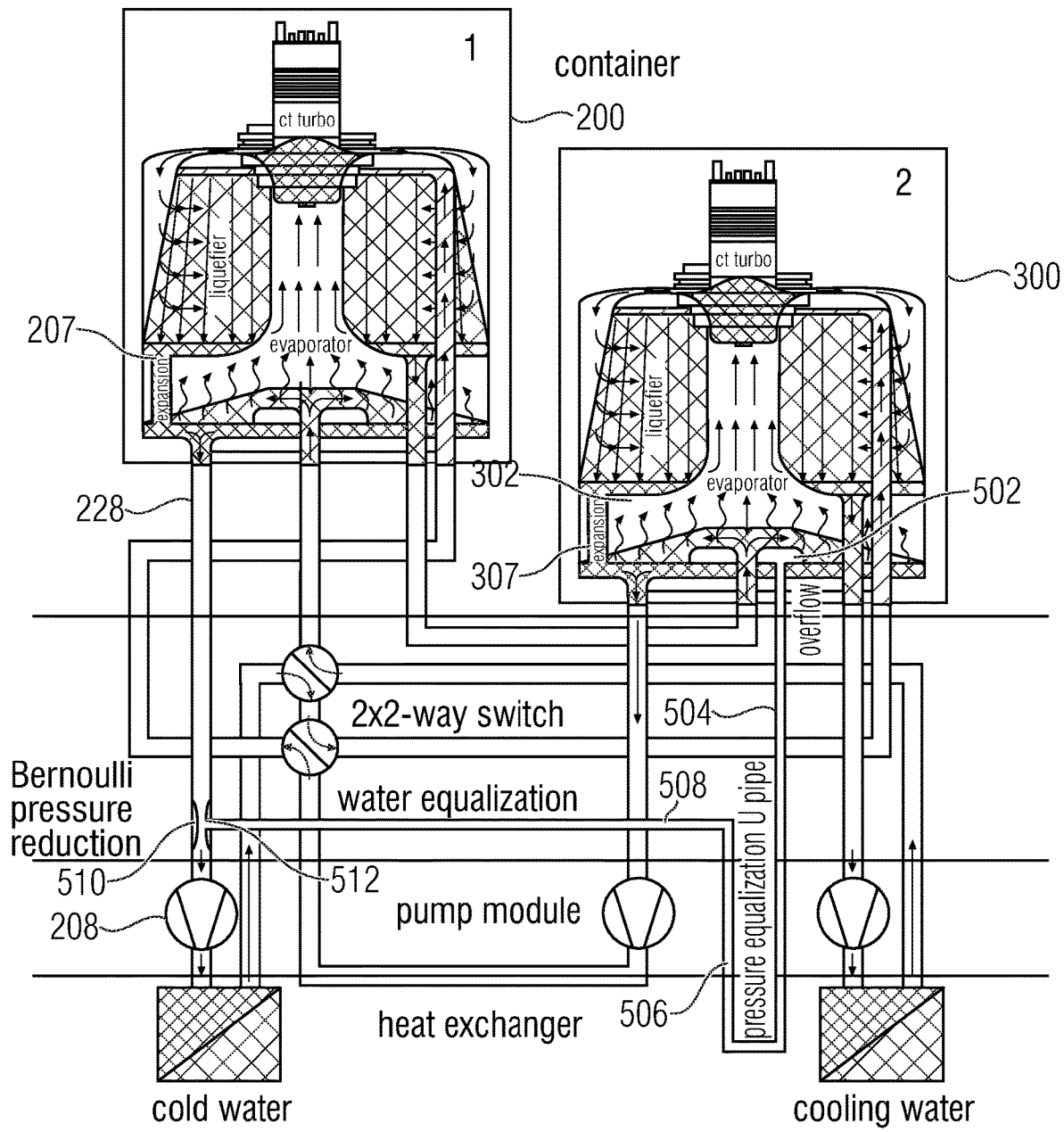
FIG. 5 shows a schematic representation of the heat pump system of FIG. 4A comprising additional self-regulating equalization of liquid between the heat pump stages.

Nevertheless it has turned out that in the arrangement shown in FIG. 3B, working liquid accumulates within the evaporator 302 of the second heat pump stage 300. Therefore, as depicted in FIG. 5, a measure is taken to direct working liquid from the evaporator 302 of the second heat pump stage 300 into the evaporator circuit of the first stage 200. To this end, an overflow arrangement 502 is arranged within the second evaporator 302 of the second heat pump stage so as to lead off working liquid as of a predefined maximum level of working liquid present within the second evaporator 302. In addition, a liquid line 504, 506, 508 is provided which is coupled to the overflow arrangement 502, on the one hand, and is coupled to a suction side of the first pump 208 at a coupling point 512, on the other hand. A pressure reducer 510, which is advantageously configured as a Bernoulli pressure reducer, i.e. as a pipe or hose bottleneck, is located at the coupling point 512. The liquid line includes a first connection portion 504, a U-shaped portion 506, and a second connection portion 508. Advantageously, the U-shaped portion 506 has a vertical height, in the operating position, which is at least equal to 5 cm and is advantageously 15 cm. Thus, a self-regulating system is obtained that operates without any pump. If the water level within the evaporator 302 of the lower container 300 is too high, working liquid flows into the U pipe 506 via the connecting lead 504. The U pipe is coupled to the suction side of the pump 208 via the connecting lead 508 at the coupling point 512 at the pressure reducer. Due to the increased flow velocity in front of the pump due to the bottleneck 510, the pressure decreases, and water from the U pipe 506 can be received. Within the U pipe, a stable water level will become established, which will be sufficient for the pressure present in front of the pump within the bottleneck and within the evaporator of the lower container. At the same time, however, the U pipe 506 presents a vapor barrier to the effect that no vapor may get from the evaporator 302 into the suction side of the pump 208. The expansion organs 207 and/or 307 are advantageously also configured as overflow arrangements so as to direct working liquid into the respective evaporator when predetermined level within a respective liquefier is exceeded. Thus, the filling levels of all containers, i.e. of all liquefiers and evaporators, in both heat pump stages are set automatically in a self-regulating manner, without any additional expenditure and without any pumps.

This is advantageous, in particular, since in this manner, heat pump stages may be put into or out of operation as a function of the operating mode.

Figure 4A:
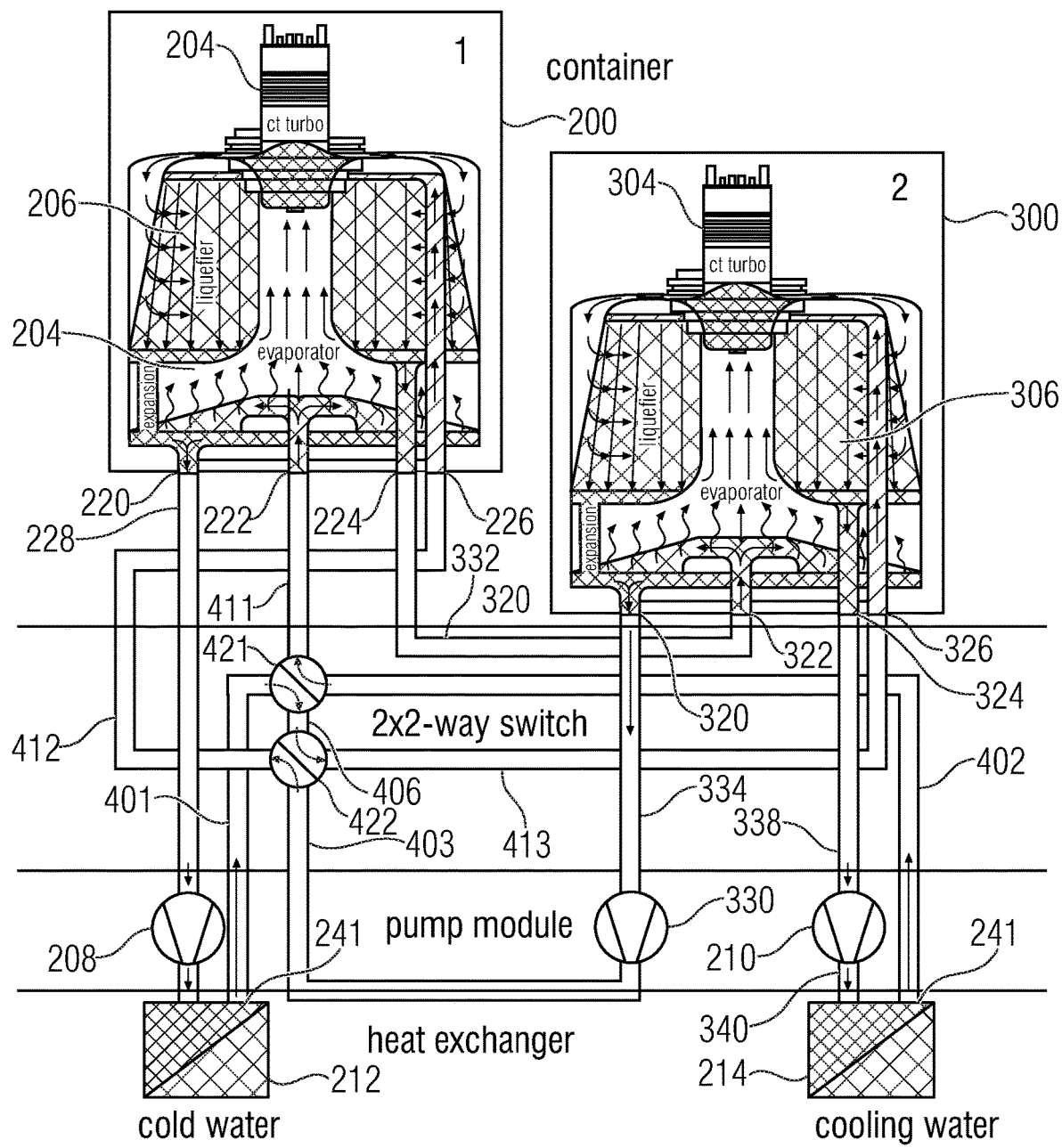
FIG. 4A shows a schematic representation of cascaded heat pump stages coupled to controllable way switches.
Figures 4B, 4C:
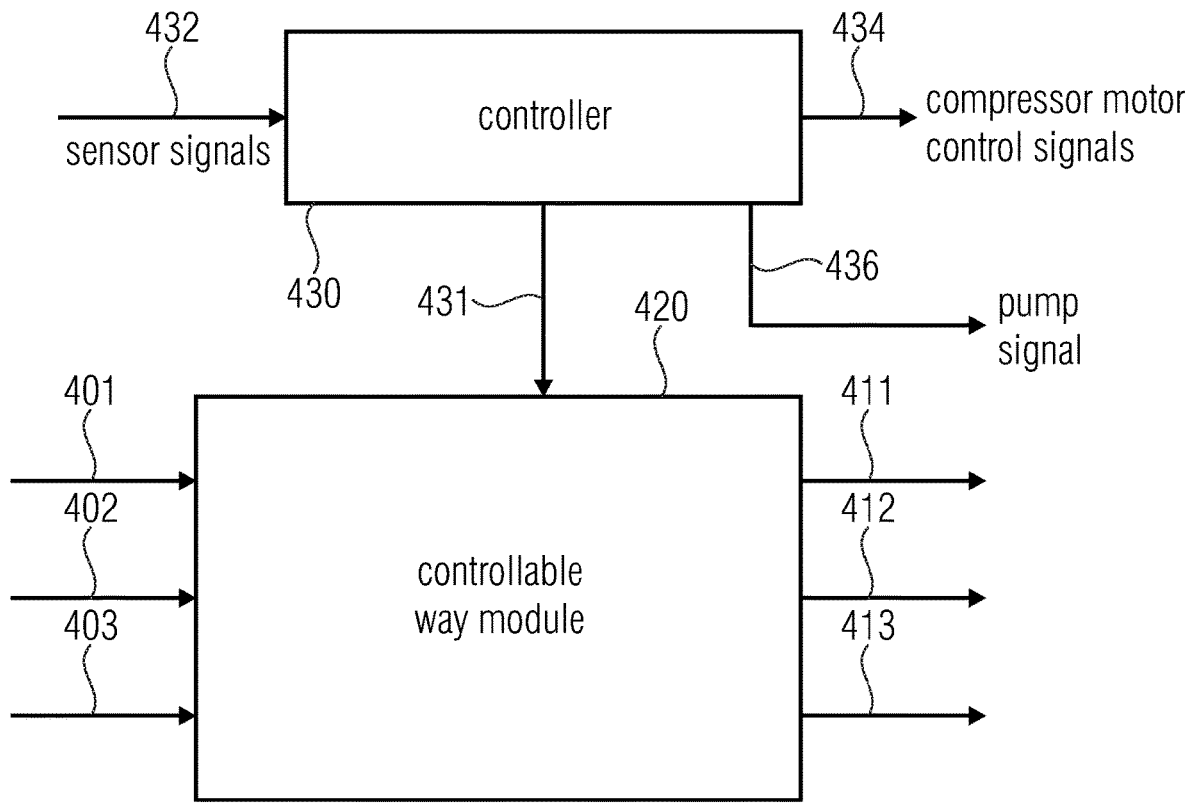
FIG. 4B shows a schematic representation of a controllable way module comprising three inputs and three outputs.
FIG. 4C shows a table for depicting the various connections of the controllable way module for different modes of operation.

FIGS. 4A and 5 already show a detailed depiction of a controllable way module on the grounds of the upper 2×2-way switch 421 and the lower 2×2-way switch 422. FIG. 4B shows a general implementation of the controllable way module 420 which may be implemented by the two serially connected 2×2-way switches 421 and 422, but which may also be implemented in an alternative manner.

The controllable way module 420 of FIG. 4B is coupled to a controller 430 so as to be controlled by same via a control line 431. The controller receives sensor signals 432 as input signals and provides pump control signals 436 and/or compressor motor control signals 434 on the output side. The compressor motor control signals 434 lead to the compressor motors 204, 304 as shown in FIG. 4A, for example, and the pump control signals 436 lead to the pumps 208, 210, 330. Depending on the implementation, however, the pumps 208, 210 may be configured to be fixed, i.e. to be non-controlled, since they anyway run in any of the operating modes described by means of FIGS. 7A, 7B. It is therefore only the intermediate-circuit pump 330 that might be controlled by a pump control signal 436.

The controllable way module 420 includes a first input 401, a second input 402 and a third input 403. As shown in FIG. 4A, for example, the first input 401 is connected to the drain 241 of the first heat exchanger 212. In addition, the second input 402 of the controllable way module is connected to the return flow, or drain, 243 of the second heat exchanger 214. In addition, the third input 403 of the controllable way module 420 is connected to a pumping side of the intermediate-circuit pump 330.

A first output 411 of the controllable way module 420 is coupled to an input 222 into the first heat pump stage 200. A second output 412 of the controllable way module 420 is connected to an entrance 226 into the liquefier 206 of the first heat pump stage. In addition, a third output 413 of the controllable way module 420 is connected to the input 326 into the liquefier 306 of the second heat pump stage 300.

The various input/output connections that are achieved by means of the controllable way module 420 are depicted in FIG. 4C.

In one mode, the high-performance mode (HPM), the first input 401 is connected to the first output 411. Moreover, the second input 402 is connected to the third output 413. In addition, the third input 403 is connected to the second output 412, as depicted in line 451 of FIG. 4C.

In the medium-performance mode (MPM), wherein only the first stage is active and the second stage is inactive, i.e. the compressor motor 304 of the second stage 300 is switched off, the first input 401 is connected to the first output 411. Further, the second input 402 is connected to the second output 412. Furthermore, the third input 403 is connected to the third output 413, as depicted in line 452. Line 453 shows the free-cooling mode wherein the first input is connected to the second output, i.e. the input 401 is connected to the output 412. Moreover, the second input 402 is connected to the first output 411. Finally, the third input 403 is connected to the third output 413.

In the low-performance mode (LPM), depicted in line 454, the first input 401 is connected to the third output 413. Additionally, the second input 402 is connected to the first output 411. Finally, the third input 403 is connected to the second output 412.

It is advantageous to implement the controllable way module by means of the two serially arranged 2-way switches 421 and 422 as are depicted in FIG. 4A, for example, or as are also depicted in FIGS. 6A to 6D. Here, the first 2-way switch 421 comprises the first input 401, the second input 402, the first output 411, and a second output 414, which is coupled to an input 404 of the second 2-way switch 422 via an interconnection 406. The 2-way switch has the third input 403 as an additional input and has the second output 412 as an output, and has the third output 413 also as an output.

Figure 6A:
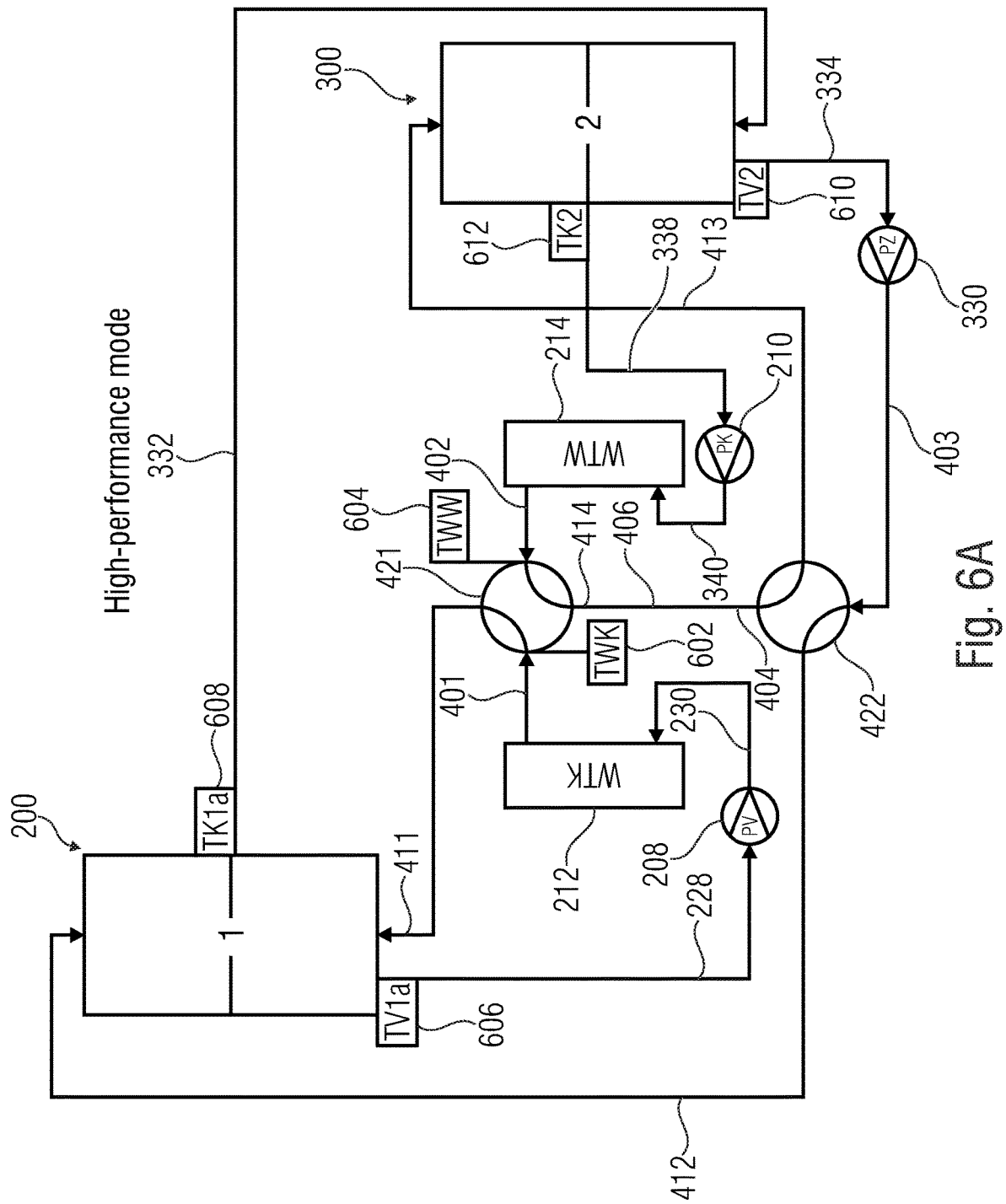
FIG. 6A shows a schematic representation of the heat pump system comprising two stages which is operated in the high-performance mode (HPM)
Figure 6B:
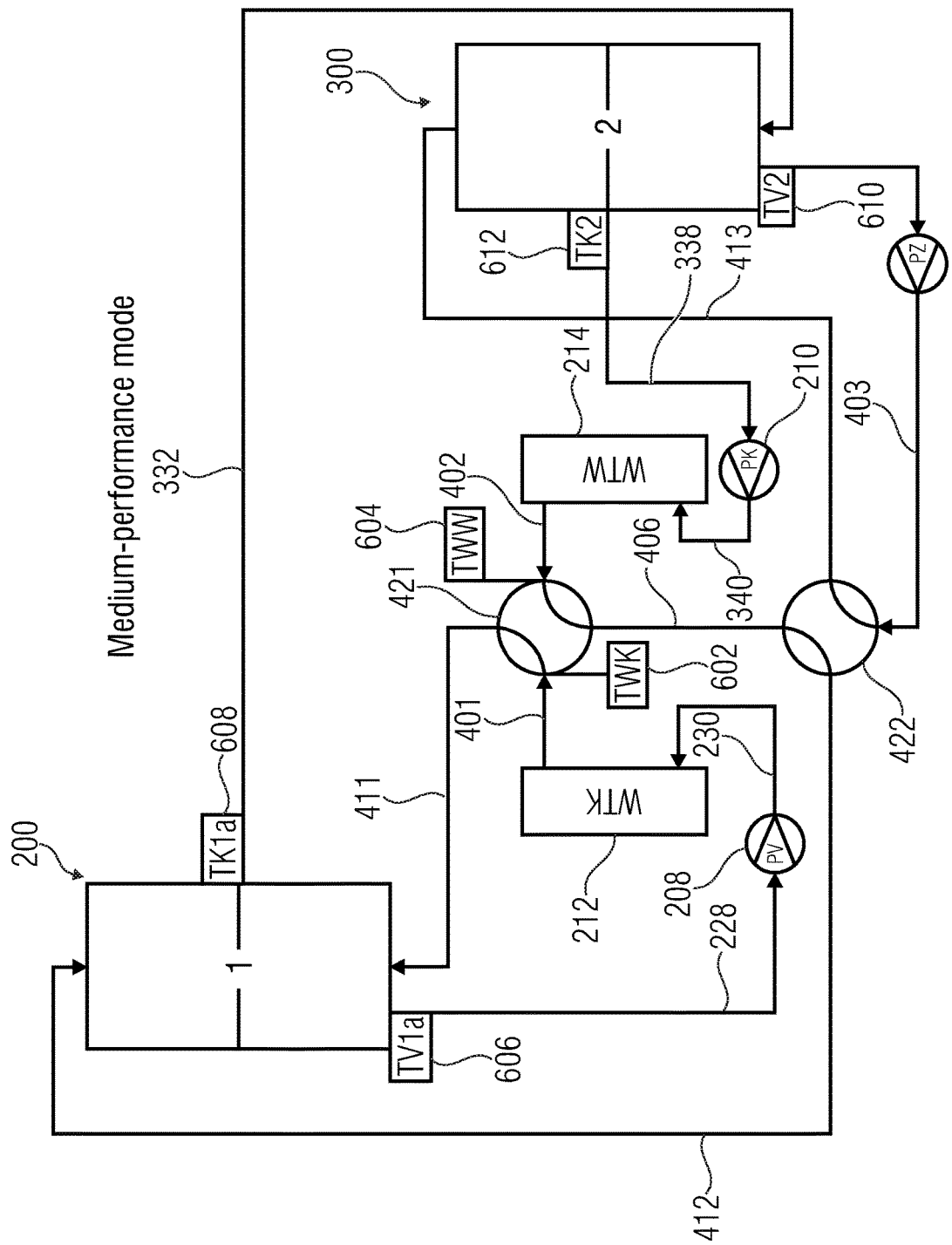
FIG. 6B shows a schematic representation of the heat pump system comprising two stages which is operated in the medium-performance mode (MPM)

The positions of the 2×2-way switches 421 are depicted in a tabular manner in FIG. 7B. FIG. 6A shows both positions of the switches 421, 422 in the high-performance mode (HPM). This corresponds to the first line in FIG. 7B. FIG. 6B shows the positions of both switches in the medium-performance mode. The upper switch 421 is just the same in the medium-performance mode as it is in the high-performance mode. Only the lower switch 422 has been switched.

Figure 6C:
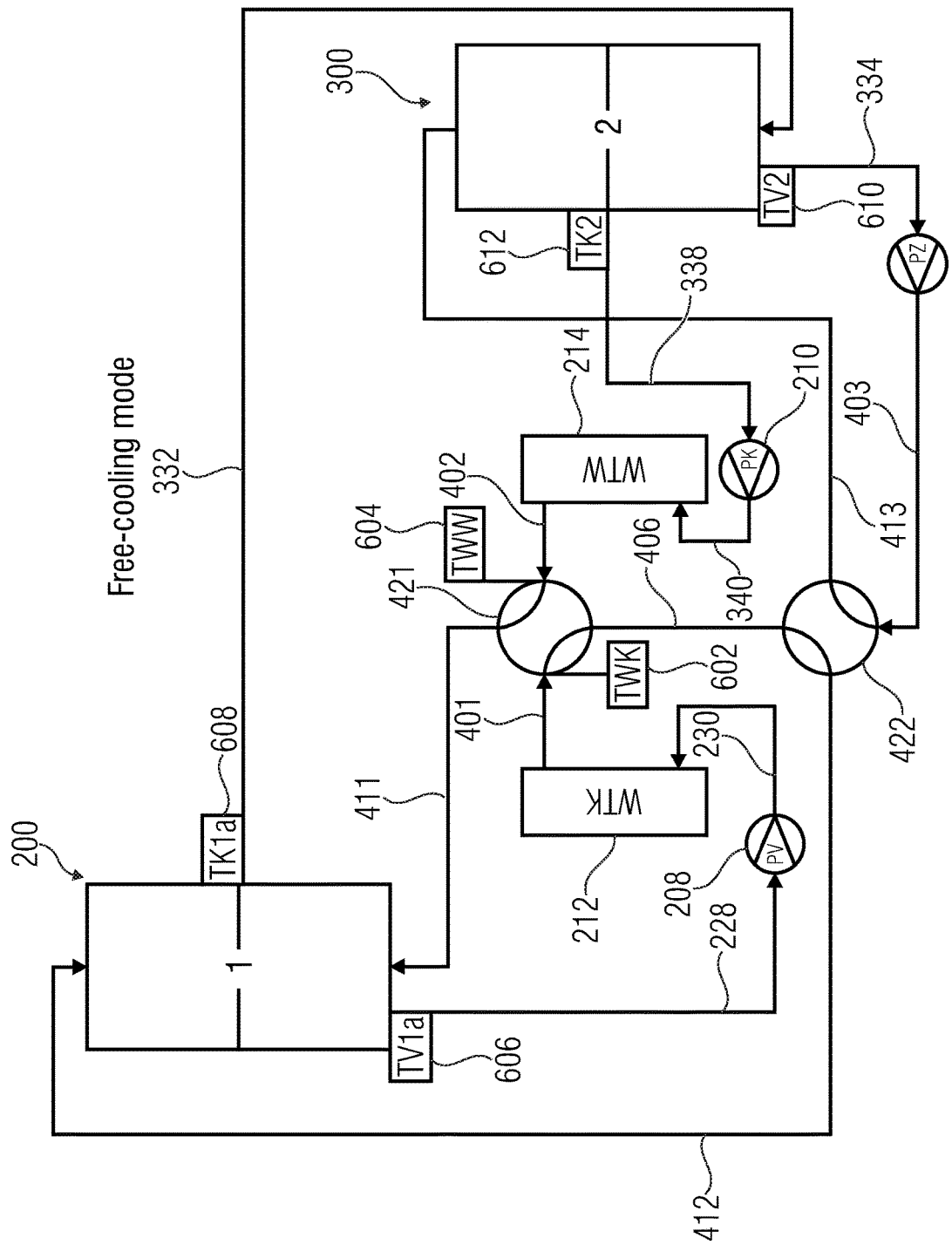
FIG. 6C shows a schematic representation of the heat pump system comprising two stages which is operated in the free-cooling mode (FCM)
Figure 6D:
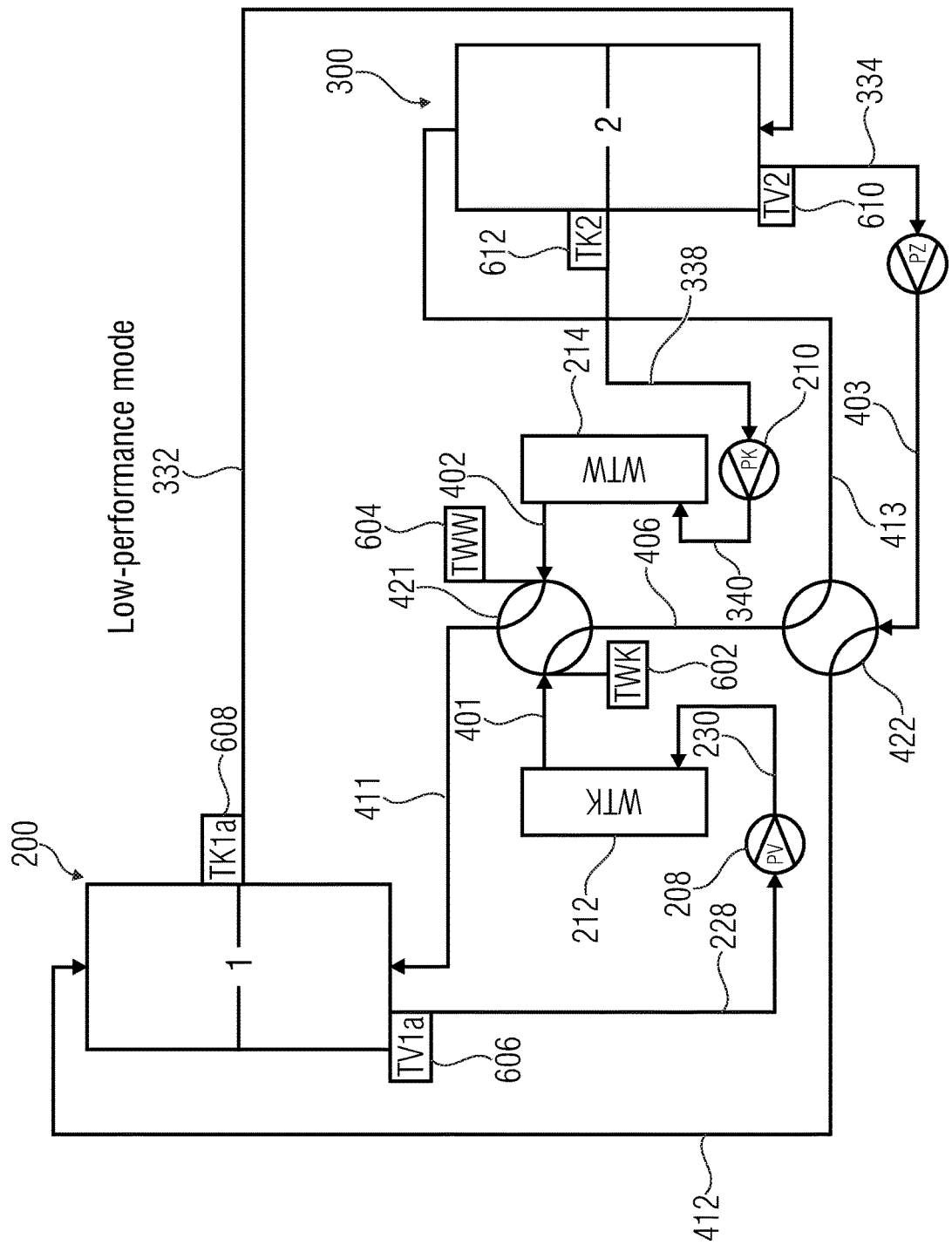
FIG. 6D shows a schematic representation of the heat pump system comprising two stages which is operated in the low-performance mode (LPM)
Figures 8A, 8B:
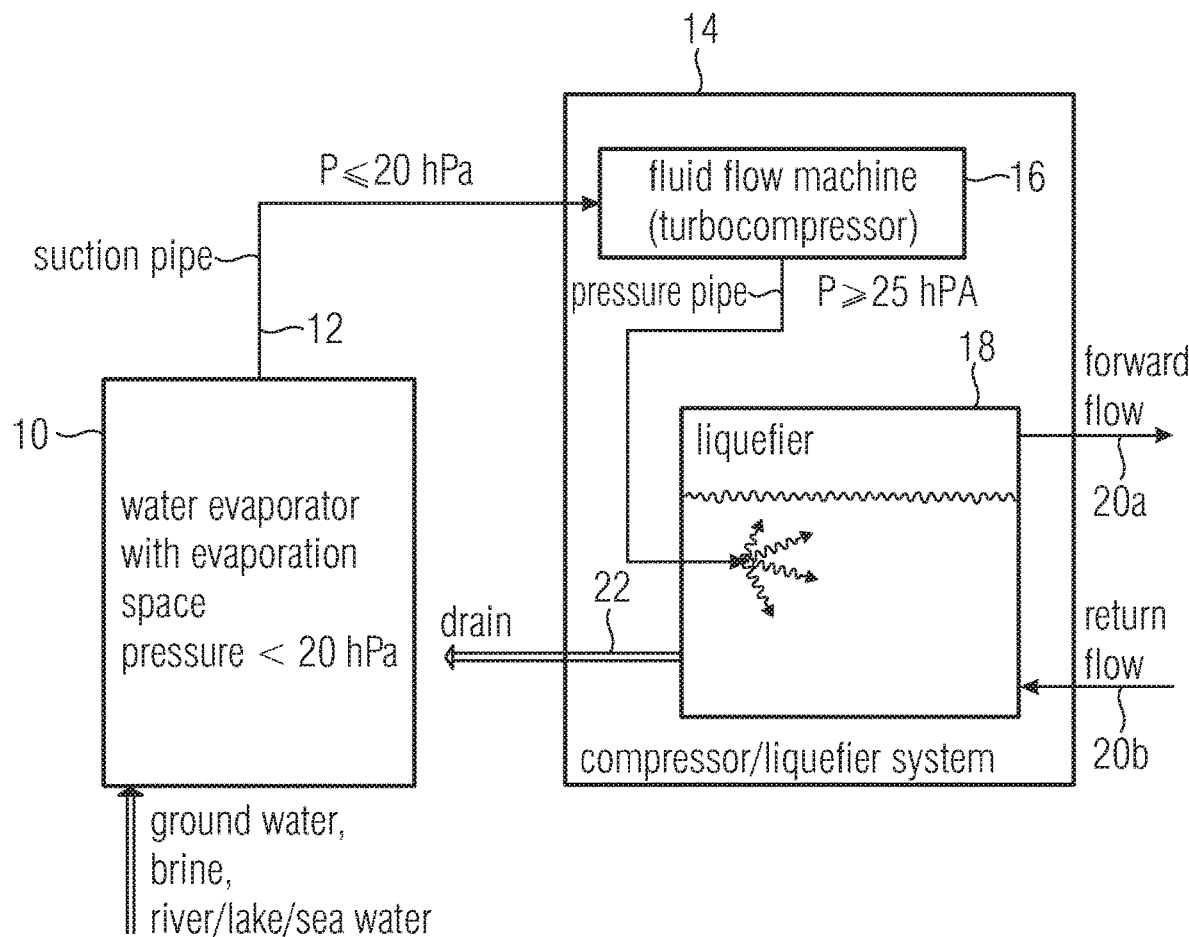
FIG. 8A shows a schematic representation of a known heat pump system comprising water as the working medium.
FIG. 8B shows a table for depicting different pressure/temperature situations for water as the working liquid.

In the free-cooling mode depicted in FIG. 6C, the lower switch is the same as it is in the medium-performance mode. Only the upper switch has been switched. In the low-performance mode, the lower switch 422 has been switched as compared to the free-cooling mode, whereas the upper switch is the same in the low-performance mode as it is in the free-cooling mode. This ensures that from one neighboring mode to the next mode, only one switch needs to be switched in each case, whereas the other switch may remain in its position. This simplifies the entire measure of switching from one mode of operation to the next.

FIG. 7A shows the activities of the individual compressor motors and pumps in the various modes. In all modes, the first pump 208 and the second pump 210 are active. The intermediate-circuit pump is active in the high-performance mode, the medium-performance mode and the free-cooling mode but is deactivated in the low-performance mode.

The compressor motor 204 of the first stage is active in the high-performance mode, the medium-performance mode and the free-cooling mode, and is deactivated in the low-performance mode. In addition, the compressor motor of the second stage is active in the high-performance mode only but is deactivated in the medium-performance mode, in the free-cooling mode and in the low-performance mode.

It shall be noted that FIG. 4A depicts the low-performance mode, wherein both motors 204, 304 are deactivated and wherein the intermediate-circuit pump 330 is activated. By contrast, FIG. 3B shows the high-performance mode, which is firmly coupled, as it were, wherein both motors and all pumps are active. FIG. 5 in turn shows the high-performance mode, wherein the switch positions are such that precisely the configuration of FIG. 3B is obtained.

FIGS. 6A and 6C further show different temperature sensors. A sensor 602 measures the temperature at the output of the first heat exchanger 212, i.e. at the return flow from the side to be cooled. A second sensor 604 measures the temperature at the return flow of the side to be heated, i.e. from the second heat exchanger 214. In addition, a further temperature sensor 606 measures the temperature at the exit 220 of the evaporator of the first stage, said temperature typically being the coldest temperature. In addition, a further temperature sensor 608 is provided which measures the temperature within the connecting lead 332, i.e. at the exit of the condenser of the first stage, which is designated by 224 in other figures. Moreover, the temperature sensor 610 measures the temperature at the exit of the evaporator of the second stage 300, i.e. at the exit 320 of FIG. 3B, for example.

Finally, the temperature sensor 612 measures the temperature at the exit 324 of the liquefier 306 of the second stage 300, said temperature being the warmest temperature within the system during the full-performance mode.

With reference to FIGS. 7C and 7D, the various stages and/or modes of operation of the heat pump system as depicted, e.g., by FIGS. 6A to 6D and as also depicted by the other figures, will be addressed below.

DE 10 2012 208 174 A1 discloses a heat pump comprising a free-cooling mode. In the free-cooling mode, the evaporator inlet is connected to a return flow from the area to be heated. In addition, the liquefier inlet is connected to a return flow from the area to be cooled. By means of the free-cooling mode, a substantial increase in efficiency is achieved, specifically for external temperatures smaller than, e.g., 22° C.

Said free-cooling mode (or FCM) is depicted in line 453 in FIG. 4C and is depicted, in particular, in FIG. 6C. For example, in particular the exit of the cold-side heat exchanger is connected to the entrance into the condenser of the first stage. In addition, the exit from the heat-side heat exchanger 214 is coupled to the evaporator entrance of the first stage, and the entrance into the heat-side heat exchanger 214 is connected to the condenser drain of the second stage 300. However, the second stage is deactivated, so that the condenser drain 338 of FIG. 6C has the same temperature, for example, as the condenser intake 413. Additionally, the evaporator drain 334 of the second stage also has the same temperature as the condenser intake 413 of the second stage, so that the second stage 300 is thermodynamically "short-circuited", as it were. However, even though the compressor motor is deactivated, said stage has working liquid flowing through it. Therefore, the second stage is still used as infrastructure but is deactivated on account of the compressor motor having been switched off.

For example, if one is to switch from the medium-performance mode to the high-performance mode, i.e. from a mode wherein the second stage is deactivated and the first stage is active, to a mode wherein both stages are active, it is advantageous to initially allow the compressor motor to run for a certain time period which is longer, for example, than one minute and advantageously amounts to five minutes, before switching the switch 442 from the switch position shown in FIG. 6B to the switch position shown in FIG. 6A.

A heat pump in the second heat pump arrangement 102/114 includes an evaporator comprising an evaporator inlet and an evaporator outlet as well as a liquefier comprising a liquefier inlet and a liquefier outlet. Additionally, a switching means is provided for operating the heat pump in one operating mode or in another operating mode. In the one operating mode, the low-performance mode, the heat pump is completely bridged to the effect that the return flow of the area to be cooled is directly connected to the forward flow of the area to be heated. Additionally, in said bridging mode or low-performance mode, the return flow of the area to be heated is connected to the forward flow of the area to be cooled. Typically, the evaporator is associated with the area to be cooled, and the liquefier is associated with the area to be heated.

However, in the bridging mode, the evaporator is not connected to the area to be cooled, and the liquefier is not connected to the area to be cooled, but both areas are "short-circuited", as it were. However, in a second alternative operating mode, the heat pump is not bridged but is typically operated in the free-cooling mode at still relatively low temperatures or is operated in the normal mode with one or two stages. In the free-cooling mode, the switching means is configured to connect a return flow of the area to be cooled to the liquefier inset and to connect a return flow of the area to be heated to the evaporator inlet. By contrast, in the normal mode the switching means is configured to connect the return flow of the area to be cooled to the evaporator inlet and to connect the return flow of the area to be heated to the liquefier inlet.

Depending on the embodiment, a heat exchanger may be provided at the exit of the heat pump, i.e. on the side of the liquefier, or at the entrance into the heat pump, i.e. on the side of the evaporator, so as to fluidically decouple the inner heat pump cycle from the outer cycle, In this case, the evaporator inlet represents the inlet of the heat exchanger that is coupled to the evaporator. Moreover, in this case the evaporator outlet represents the outlet of the heat exchanger, which in turn is firmly coupled to the evaporator.

By analogy therewith, on the liquefier side, the liquefier outlet is a heat exchanger outlet, and the liquefier inlet is a heat exchanger inlet, specifically on that side of the heat exchanger which is not firmly coupled to the actual liquefier.

Alternatively, however, the heat pump may be operated without any input-side or output side heat exchanger. In this case, one heat exchanger, respectively, might be provided, e.g., at the input into the area to be cooled or at the input into the area to be heated, which heat exchanger will then include the return flow from and/or the forward flow to the area to be cooled or the area to be heated.

In advantageous embodiments, the heat pump is used for cooling, so that the area to be cooled is, e.g., a room of a building, a computer room or, generally, a cold room or a supermarket facility, whereas the area to be heated is, e.g., a roof of a building or a similar location where a heat-dissipation device may be placed so as to dissipate heat to the environment, However, if as an alternative to the former case, the heat pump is used for heating, the area to be cooled will be the environment from which energy is to be withdrawn, and the area to be heated will be the "useful application", i.e., for example, the interior of a building, of a house or of a room that is to be brought to or kept at a specific temperature.

Thus, the heat pump is capable of switching from the bridging mode either to the free-cooling mode or, if no such free-cooling mode is configured, to the normal mode.

Generally, the heat pump is advantageous in that it becomes particularly efficient in the event of external temperatures smaller than, e.g., 16° C., which is frequently the case at least in locations of the Northern and Southern hemispheres that are at a large distance from the equator.

In this manner one achieves that in the event of external temperatures at which direct cooling is possible, the heat pump may be completely put out of operation. In the event of a heat pump having a centrifugal compressor arranged between the evaporator and the liquefier, the impeller wheel may be stopped, and no more energy needs to be input into the heat pump. Alternatively, however, the heat pump may still run in a standby mode or the like, which, however, due to its nature of being a standby mode only involves a small amount of current consumption. In particular with valveless heat pumps as are advantageously employed, a heat short-circuit may be avoided, in contrast to the free-cooling mode, by fully bridging the heat pump.

In addition, it is advantageous for the switching means to completely disconnect, in the first mode of operation, i.e. in the low-performance or bridging mode, the return flow of the area to be cooled or the forward flow of the area to be cooled from the evaporator so that no liquid connection exists any longer between the inlet and/or the outlet of the evaporator and the area to be cooled. Said complete disconnection will be advantageous on the liquefier side as well.

In implementations, a temperature sensor means is provided which senses a first temperature with regard to the evaporator or a second temperature with regard to the liquefier. In addition, the heat pump comprises a controller coupled to the temperature sensor means and configured to control the switching means as a function of one or more temperatures sensed within the heat pump, so that the switching means switches from the first to the second mode of operation, or vice versa. Implementation of the switching means may be effected by an input switch and an output switch, which comprise four inputs and four outputs, respectively, and are switchable as a function of the mode. Alternatively, however, the switching means may also be implemented by several individual cascaded change-over switches, each of which comprises an input and two outputs.

In addition, the coupling element for coupling the bridging line to the forward flow into the area to be heated or the coupler for coupling the bridging line to the forward flow into the area to be cooled may be implemented as a simple three-connection combination, i.e., as a liquid adder. However, in implementations it is advantageous, in order to obtain optimum decoupling, to configure the couplers also as change-over switches and/or as being integrated into the input switch and/or output switch.

Moreover, a first temperature sensor on the evaporator side is used as the specific temperature sensor, and a second temperature sensor on the liquefier side is used as the second temperature sensor, an all the more direct measurement being advantageous. The evaporator-side measurement is used, in particular, for controlling the speed of the temperature raiser, e.g., of a compressor of the first and/or second stage(s), whereas the liquefier-side measurement or also a measurement of the ambient temperature is employed for performing mode control, i.e., to switch the heat pump from, e.g., the bridging mode to the free-cooling mode, when a temperature is no longer within the very cold temperature range but within the temperature range of medium coldness. However, if the temperature is higher, i.e., within a warm temperature range, the switching means will bring the heat pump into a normal mode with a first active stage or with two active stages.

With a two-stage heat pump, however, in said normal mode, which corresponds to the medium-performance mode, only one first stage will be active, whereas the second stage is still inactive, i.e., is not supplied with current and therefore requires no energy. Not until the temperature rises further, specifically to a very warm range, a second pressure stage will be activated in addition to the first heat pump stage or in addition to the first pressure stage, which second pressure stage in turn will comprise an evaporator, a temperature raiser, typically in the form of a centrifugal compressor, and a liquefier. The second pressure stage may be connected to the first pressure stage in series or in parallel or in series/in parallel.

In order to ensure that in the bridging mode, i.e., when the outside temperatures are already relatively cold, the cold from outside will not fully enter into the heat pump system and, beyond same, into the room to be cooled, i.e., will render the area to be coded even colder than it actually should be, it is advantageous to provide, by means of a sensor signal, a control signal at the forward flow into the area to be cooled or at the return flow of the area to be cooled, which control signal may be used by a heat dissipation device mounted outside the heat pump so as to control the dissipation of heat, i.e., to reduce the dissipation of heat when the temperatures become too cold. The heat dissipation device is, e.g., a liquid/air heat exchanger, comprising a pump for circulating the liquid introduced into the area to be heated. In addition, the heat dissipation device may have a ventilator so as to transport air into the air heat exchanger. Additionally or alternatively, a three-way mixer may also be provided so as to partly or fully short-circuit the air heat exchanger. Depending on the forward flow into the area to be cooled, which in this bridging mode is not connected to the evaporator outlet, however, but to the return flow from the area to be heated, the heat dissipation device, i.e., the pump, the ventilator or the three-way mixer, for example, is controlled to continuously reduce the dissipation of heat in order to maintain a temperature level, specifically within the heat pump system and within the area to be cooled, which in this case may be above the level of the outside temperature. Thus, the waste heat may even be used for heating the room "to be cooled" when the outside temperatures are too cold.

In a further aspect, total control of the heat pump is effected such that, depending on a temperature sensor output signal of a temperature sensor on the evaporator side, "fine control" of the heat pump is effected, i.e., a speed control in the various modes, i.e., e.g., in the free-cooling mode, the normal mode having the first stage and the normal mode having the second stage, and also control of the heat dissipation device in the bridging mode, whereas mode switching is effected as coarse control by means of a temperature sensor output signal of a temperature sensor on the liquefier side. Thus, switching of the mode of operation from the bridging mode (or LPM) to the free-cooling mode (or FCM) and/or into the normal mode (MPM or HPM) is performed merely on the basis of a liquefier-side temperature sensor; the evaporator-side temperature output signal is not taken into account in the decision whether switching takes place or not. However, for speed control of the centrifugal compressor and/or for controlling the heat dissipation devices, it is again only the evaporator-side temperature output signal that is used rather than the liquefier-side sensor output signal.

It shall be noted that the various aspects of the present invention with regard to the arrangement and the two-stage system as well as with regard to utilization of the bridging mode, control of the heat dissipation device in the bridging mode or free-cooling mode, or control of the centrifugal compressor in the free-cooling mode or the normal mode of operation, or with regard to utilization of two sensors, one sensor being used for switching the mode of operation and the other sensor being used for fine control, may be employed irrespective of one another. However, said aspects may also be combined in pairs or in larger groups or even with one another.

FIGS. 7A to 7D show overviews of various modes wherein the heat pump of FIG. 1, FIG. 2, FIGS. 8A, 9A may be operated. If the temperature of the area to be heated is very cold, e.g. less than 16° C., the operating mode selection will activate the first operating mode wherein the heat pump is bridged and the control signal 36b for the heat dissipation device is generated in the area 16 to be heated. If the temperature of the area to be heated, i.e., of the area 16 of FIG. 1, is within a medium-cold temperature range, i.e., within a range between 16° C. and 22° C., the operating mode controller will activate the free-cooling mode, wherein the first stage of the heat pump may operate at low power due to the small temperature spread. However, if the temperature of the area to be heated is within a warm temperature range, i.e., e.g., between 22° C. and 28° C., the heat pump will be operated in the normal mode, however, in the normal mode with a first heat pump stage. If, however, the outside temperature is very warm, i.e., within a temperature range from 28° C. to 40° C., a second heat pump stage will be activated which also operates in the normal mode and which supports the first stage which is already running.

Advantageously, speed control and/or "fine control" of a centrifugal compressor is effected, within the temperature raiser 34 of FIG. 1 within the temperature ranges of "medium cold", "warm", "very warm" so as to operate the heat pump only ever at that heating/cooling capacity that may currently be used by the actually present conditions.

Advantageously, mode switching is controlled by a liquefier-side temperature sensor, whereas fine control and/or the control signal for the first mode of operation depend on an evaporator-side temperature.

It shall be noted that the temperature ranges of "very cold", "medium cold", "warm", "very warm" represent different temperature ranges whose respectively average temperatures increase from very cold to medium cold to warm to very warm. As is depicted by FIG. 7C, the ranges may directly adjoin one another. However, in embodiments, the ranges may also overlap and be at the mentioned temperature level or at a different temperature level, which may be higher or lower in total. Moreover, the heat pump is advantageously operated with water as the working medium. Depending on the requirement, however, other means may also be employed.

This is depicted in a tabular manner in FIG. 7D. If the liquefier temperature lies within a very cold temperature range, the controller 430 will react by setting the first mode of operation. If it is found in this mode that the evaporator temperature is lower than a target temperature, a reduction in the thermal output is achieved by a control signal at the heat dissipation device. However, if the liquefier temperature is within the medium-cold range, the controller 430 may be expected to react thereto by switching to the free-cooling mode, as is shown by lines 431 and 434. If the evaporator temperature here exceeds a target temperature, this will result in an increase in the speed of the centrifugal compressor of the compressor via the control line 434. If it is found, in turn, that the liquefier temperature is within a warm temperature range, the first stage will be put into normal operation as a reaction thereto, which is performed by a signal on the line 434. If it is found, in turn, that given a specific speed of the compressor, the evaporator temperature still exceeds a target temperature, this will result, as a reaction thereto, in an increase in the speed of the first stage again via the control signal on the line 434. If it is eventually found that the liquefier temperature is within a very warm temperature range, a second stage will be additionally switched on during normal operation as a reaction thereto, which again is effected by a signal on the line 434. Depending on whether the evaporator temperature is higher or lower than a target temperature, as is signaled by the signals on the line 432, control of the first and/or second stage is performed so as to react to a changed situation.

In this manner, transparent and efficient control is achieved which, on the one hand, achieves "coarse tuning" due to the mode switching, and on the other hand achieves "fine tuning" on account of temperature-dependent speed adjustment, to the effect that only so much energy needs to be consumed at any point in time as may actually be currently used. Said approach, which does not involve continuous turn-on and turn-off operations in a heat pump, such as with known heat pumps comprising hysteresis, for example, also ensures that no starting losses arise due to continuous operation.

Advantageously, speed control and/or "fine control" of a centrifugal compressor within the compressor motor of FIG. 1 is effected within the temperature ranges of "medium cold", "warm", "very warm" so as to operate the heat pump only with that thermal performance/refrigerating capacity that may be currently used by the actually present conditions.

Advantageously, mode switching is controlled by a liquefier-side temperature sensor, whereas fine control and/or the control signal for the first operating mode depend on an evaporator-side temperature.

In the event of mode switching, the controller 430 is configured to sense a condition for transition from the medium-performance mode to the high-performance mode. Then the compressor 304 is started in the further heat pump stage 300. It is not until a predetermined time period, which is longer than one minute and advantageously even longer than four or even five minutes, has expired that the controllable way module is switched from the medium-performance mode to the high-performance mode. In this manner, it is achieved that switching may be simply performed from a resting position; allowing the compressor motor to run prior to switching ensures that the pressure within the evaporator becomes smaller than the pressure within the compressor.

It shall be noted that the temperature ranges in FIG. 7C may be varied. In particular, the threshold temperatures, between a very cold temperature and a medium-cold temperature, i.e., the value 16° C. in FIG. 7C, as well as between the medium-cold temperature and the warm temperature, i.e., the value of 22° C. in FIG. 7C, and the value between the warm and the very warm temperature, i.e. the value of 28° C. in FIG. 7C, are only exemplarily. Advantageously, the threshold temperature ranging between warm and very warm, at which switching from the medium-performance mode to the high-performance mode takes place, amounts to from 25 to 30° C. In addition, the threshold temperature ranging between warm and medium cold, i.e., when switching takes place between the free-cooling mode and the medium-performance mode, lies within a temperature range from 18 to 24° C. Eventually, the threshold temperature at which switching is performed between the medium cold mode and the very cold mode ranges from 12 to 20° C.; the values are advantageously selected as shown in the table of FIG. 7C but may be set differently within the ranges mentioned, as was said before.

However, depending on the implementation and the requirement profile, the heat pump system may also be operated in four modes of operation, which also differ from one another but are all at different absolute levels, so that the designations "very cold", "medium cold", "warm", "very warm" are to be understood only in relation to one another but are not to represent any absolute temperature values.

Even though specific elements are described as device elements, it shall be noted that said description may be equally regarded as a description of steps of a method, and vice versa. For example, the block diagrams described in FIGS. 6A to 6D similarly represent flowcharts of a corresponding inventive method.

In addition, it shall be noted that the controller may be implemented, e.g., as hardware or as software by the element 430 in FIG. 4B, which also applies to the tables in FIG. 4C, 4D or 7A, 7B, 7C, 7D. The controller may be implemented on a non-volatile storage medium, a digital or other storage medium, in particular a disc or CD comprising electronically readable control signals which may cooperate with a programmable computer system such that the corresponding method of pumping heat and/or of operating a heat pump is performed. Generally, the invention thus also includes a computer program product comprising a program code, stored on a machine-readable carrier, for performing the method when the computer program product runs on a computer. In other words, the invention may thus be also implemented as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention, It is therefore intended that the following appended claims be interpreted as including all such alterations, permutations and equivalents as fall within the true spirit and scope of the present invention.

The invention claimed is:

1. Heat pump system comprising:
a first heat pump arrangement configured to operate with a first heat pump medium comprising CO2;
a second heat pump arrangement configured to operate with a second heat pump medium comprising water, wherein the second heat pump arrangement comprises an input portion, an evaporator, a liquefier, and an output portion, the input portion being coupled to the evaporator of the second heat pump arrangement, and the output portion being coupled to the liquefier of the second heat pump arrangement,
wherein the second heat pump arrangement comprises a controller configured to control, as a function of a temperature prevailing at the input portion or of a temperature prevailing at the output portion, such that consumption of electric power by the second heat pump arrangement increases as the temperature prevailing at the input portion or at the output portion increases, and decreases as the temperature prevailing at the input portion or the output portion decreases, and wherein the second heat pump arrangement comprises a turbocompressor including a radial impeller, a rotational speed of the radial impeller being controllable as a function of the temperature prevailing at the input portion or of the temperature prevailing at the output portion; and
a coupler for thermally coupling the first heat pump arrangement to the second heat pump arrangement,
said coupler comprising a first heat exchanger including a primary side and a secondary side, the secondary side of the first heat exchanger being coupled to the evaporator of the second heat pump arrangement via the input portion, and the primary side of the first heat exchanger being coupled to the first heat pump arrangement, and
said coupler comprising a second heat exchanger including a primary side and a secondary side, the secondary side of the second heat exchanger being coupled to the liquefier of the second heat pump arrangement via the output portion, and
the primary side of the second heat exchanger being coupled to the first heat pump arrangement.

2. Heat pump system as claimed in claim 1, further comprising a re-cooler configured to be coupled to an environment, the output portion of the second heat pump arrangement being coupled to the re-cooler.

3. Heat pump system as claimed in claim 2, wherein the output portion comprises a heat exchanger by means of which a re-cooler cycle is fluidically separated from the second heat pump arrangement, the re-cooler cycle being configured to operate at a pressure which is higher than a pressure prevailing within the second heat pump arrangement and is lower than a pressure prevailing within the first heat pump arrangement.

4. Heat pump system as claimed in claim 2, wherein the re-cooler comprises a liquid cycle configured to carry a water/glycol mixture or water, or wherein the first heat pump arrangement comprises a compressor, the coupler being configured such that the primary side of the first heat exchanger or of the second heat exchanger is connected to a compressor output of the first heat pump arrangement.

5. Heat pump system as claimed in claim 1, wherein the first heat pump arrangement comprises a compressor, wherein the second heat exchanger is coupled to the compressor of the first heat pump arrangement, and the first heat exchanger is coupled to the second heat exchanger via a connecting lead.

6. Heat pump system as claimed in claim 5,
wherein the primary side of the first heat exchanger comprises a first primary input and a first primary output,
wherein the secondary side of the first heat exchanger comprises a first secondary input and a first secondary output,
wherein the primary side of the second heat exchanger comprises a second primary input and a second primary output,
wherein the secondary side of the second heat exchanger comprises a second secondary output and a second secondary input,
wherein the second primary input is connected to a compressor output of the first heat pump arrangement,
wherein the second primary output is connected to the first primary input of the first heat exchanger via a connecting lead, and
wherein the first primary output of the first heat exchanger is thermally coupled to a point of the first heat pump system which differs from the compressor output.

7. Heat pump system as claimed in claim 6, wherein that point of the first heat pump system to which the first primary output of the first heat exchanger is coupled is an evaporator input of an evaporator of the first heat pump arrangement or a throttle input of a throttle of the first heat pump arrangement.

8. Heat pump system as claimed in claim 6,
wherein the first secondary input or the first secondary output is connected to an input portion or to the evaporator of the second heat pump arrangement.

9. Heat pump system as claimed in claim 6,
wherein the second secondary input is connected to the liquefier of the second heat pump arrangement via the output portion of the second heat pump arrangement, or
wherein the second secondary output is connected to a re-cooler.

10. Heat pump system as claimed in claim 6,
which comprises a re-cooler, wherein the output portion of the second heat pump arrangement comprises an output heat exchanger whose primary side is coupled to the re-cooler and whose secondary side is coupled to the liquefier via the output portion of the second heat pump arrangement.

11. Heat pump system as claimed in claim 1,
wherein a connection between consumption of the electrical power and the temperature prevailing at the input portion or at the output portion is approximately linear at least in one operating mode of the second heat pump arrangement.

12. Heat pump system as claimed in claim 1, wherein the second heat pump arrangement comprises:
a heat pump stage including a first evaporator, a first liquefier, and a first compressor; and
a further heat pump stage including a second evaporator, a second liquefier, and a second compressor,
wherein a first liquefier exit of the first liquefier is connected to a second evaporator entrance of the second evaporator via a connecting lead.

13. Heat pump system as claimed in claim 12, wherein the second heat pump arrangement further comprises a controllable way module to control the heat pump arrangement and the controllable way module to operate the second heat pump arrangement in one of at least two different modes, the second heat pump arrangement being configured to perform at least two modes selected from a group of modes comprising:
a high-performance mode in which the heat pump stage and the further heat pump stage are active;
a medium-performance mode in which the heat pump stage is active and the further heat pump stage is inactive;
a free-cooling mode in which the heat pump stage is active and the further heat pump stage is inactive and the second heat exchanger is coupled to an evaporator inlet of the heat pump stage; and
a low-performance mode in which the heat pump stage and the further heat pump stage are inactive,
wherein the controller is configured to detect a condition for a transition from the medium-performance mode to the high-performance mode so as to start the compressor in the further heat pump stage, and to switch the controllable way module from the medium-performance mode to the high-performance mode not until a predetermined time period, which is longer than one minute, has expired.

14. Method of producing a heat pump system comprising a first heat pump arrangement configured to operate with a first heat pump medium comprising CO2, and comprising a second heat pump arrangement configured to operate with a second heat pump medium comprising water, wherein the second heat pump arrangement comprises an input portion, an evaporator, a liquefier, and an output portion, the input portion being coupled to the evaporator of the second heat pump arrangement, and the output portion being coupled to the liquefier of the second heat pump arrangement, wherein the second heat pump arrangement comprises a controller configured to control, as a function of a temperature prevailing at the input portion or of a temperature prevailing at the output portion, such that consumption of electric power by the second heat pump arrangement increases as the temperature prevailing at the input portion or at the output portion increases, and decreases as the temperature prevailing at the input portion or the output portion decreases, and wherein the second heat pump arrangement comprises a turbocompressor including a radial impeller, a rotational speed of the radial impeller being controllable as a function of the temperature prevailing at the input portion or of the temperature prevailing at the output portion, the method comprising:
thermally coupling the first heat pump arrangement and the second heat pump arrangement to a coupler, said coupler comprising a first heat exchanger including a primary side and a secondary side, the secondary side of the first heat exchanger being coupled to the evaporator of the second heat pump arrangement via the input portion, and the primary side of the first heat exchanger being coupled to the first heat pump arrangement, and the coupler comprising a second heat exchanger including a primary side and a secondary side, the secondary side of the second heat exchanger being coupled to the liquefier of the second heat pump arrangement via the output portion, and the primary side of the second heat exchanger being coupled to the first heat pump arrangement.

15. Method of operating a heat pump system, comprising:
operating a first heat pump arrangement including a first heat pump medium comprising CO2;
operating a second heat pump arrangement including a second heat pump medium comprising water, wherein the second heat pump arrangement comprises an input portion, an evaporator, a liquefier, and an output portion, the input portion being coupled to the evaporator of the second heat pump arrangement, and the output portion being coupled to the liquefier of the second heat pump arrangement, wherein the second heat pump arrangement comprises a turbocompressor including a radial impeller;
thermally coupling the first heat pump arrangement to the second heat pump arrangement with a coupler, said coupler comprising a first heat exchanger including a primary side and a secondary side, the secondary side of the first heat exchanger being coupled to the evaporator of the second heat pump arrangement via the input portion, and the primary side of the first heat exchanger being coupled to the first heat pump arrangement, and the coupler comprising a second heat exchanger including a primary side and a secondary side, the secondary side of the second heat exchanger being coupled to the liquefier of the second heat pump arrangement via the output portion, and the primary side of the second heat exchanger being coupled to the first heat pump arrangement; and
controlling a rotational speed of the radial impeller as a function of a temperature prevailing at the input portion or of a temperature prevailing at the output portion, so that consumption of electric power by the second heat pump arrangement increases as the temperature prevailing at the input portion or at the output portion increases, and decreases as the temperature prevailing at the input portion or the output portion decreases.

* * * * *